United States Patent
Yoshihama et al.

(10) Patent No.: US 10,608,829 B1
(45) Date of Patent: Mar. 31, 2020

(54) BLOCKCHAIN TIMESTAMP AGREEMENT

(71) Applicant: International Business Machines Corporation, Armonk, NY (US)

(72) Inventors: Sachiko Yoshihama, Kawasaki (JP); Tatsushi Inagaki, Yokohama (JP); Yohei Ueda, Tokyo (JP); Kohichi Kamijoh, Tokyo (JP); Hiroaki Nakamura, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/153,980

(22) Filed: Oct. 8, 2018

(51) Int. Cl.
| | | |
|---|---|---|
| G06F 15/173 | (2006.01) | |
| H04L 9/32 | (2006.01) | |
| H04L 12/26 | (2006.01) | |
| G06Q 20/38 | (2012.01) | |
| H04L 9/06 | (2006.01) | |
| G06F 16/27 | (2019.01) | |
| G06F 16/18 | (2019.01) | |
| G06F 16/182 | (2019.01) | |
| H04L 29/06 | (2006.01) | |

(52) U.S. Cl.
CPC ........ *H04L 9/3297* (2013.01); *G06F 16/1805* (2019.01); *G06F 16/1834* (2019.01); *G06F 16/27* (2019.01); *G06Q 20/382* (2013.01); *H04L 9/0643* (2013.01); *H04L 29/06* (2013.01); *H04L 43/0852* (2013.01); *H04L 43/106* (2013.01); *H04L 2209/38* (2013.01)

(58) Field of Classification Search
CPC ... H04L 29/08072; H04L 29/06; H04L 45/64; H04L 47/2425; H04L 63/10
USPC .......... 709/220, 224, 226, 228, 232
See application file for complete search history.

(56) References Cited

U.S. PATENT DOCUMENTS

| | | | |
|---|---|---|---|
| 10,003,506 B2 * | 6/2018 | Rochon | H04L 41/5009 |
| 10,454,765 B2 * | 10/2019 | Davis | H04L 69/16 |
| 2016/0283920 A1 * | 9/2016 | Fisher | G06Q 20/02 |
| 2016/0350749 A1 | 12/2016 | Wilkins et al. | |
| 2017/0163733 A1 * | 6/2017 | Grefen | H04L 9/3236 |
| 2017/0338963 A1 | 11/2017 | Berg | |
| 2018/0091524 A1 | 3/2018 | Setty et al. | |
| 2018/0197156 A1 * | 7/2018 | Beesley | H04L 47/781 |
| 2018/0329670 A1 * | 11/2018 | Einziger | G06F 3/162 |

(Continued)

FOREIGN PATENT DOCUMENTS

WO 2017218986 A1 12/2017

OTHER PUBLICATIONS

List of IBM Patents or Patent Applications Treated as Related, Oct. 17, 2018.

(Continued)

*Primary Examiner* — Khanh Q Dinh

(57) ABSTRACT

An example operation may include one or more of receiving a blockchain request from a client application, determining a network latency between the client application and the endorsing node based on a network path between the client application and the endorsing node, extracting a timestamp from the blockchain request, determining whether the extracted timestamp is invalid based on the network latency between the client application and the endorsing node, and in response to determining that the timestamp is valid, generating an endorsement for the blockchain request and transmitting the endorsement to the client application.

25 Claims, 20 Drawing Sheets

(56) References Cited

U.S. PATENT DOCUMENTS

2018/0329671 A1* 11/2018 Einziger ............... G06F 3/162
2019/0079950 A1* 3/2019 Ramabaja ............. H04L 9/3236

OTHER PUBLICATIONS

S. Yoshihama et al., "Blockchain Timestamp Agreement", U.S. Appl. No. 16/154,051, filed Oct. 8, 2018 (a copy is not provided as this application is available to the Examiner).
S. Yoshihama et al., "Blockchain Timestamp Agreement", U.S. Appl. No. 16/154,063, filed Oct. 8, 2018 (a copy is not provided as this application is available to the Examiner).
Bela Gipp et al: "Decentralized Trusted Timestamping using the Crypto Currency Bitcoin", Feb. 13, 2015 (Feb. 13, 2015), XP055394233, Retrieved from the Internet: URL:https://www.gipp.com/wp-content/paperc ite-data/pdf/gipp15a.pdf Sections 2 and 3.
International Search Report and Written Opinion issued in the corresponding International Application No. PCT?EP2019/077111, dated Dec. 6, 2019.
Pawel Szalachowski: "Towards More Reliable Bitcoin Timestamps", ARXIV.ORG, Cornell University Library, 201 Olin Li Bra Ry Cornell University Ithaca, NY 14853, Mar. 24, 2018 (Mar. 24, 2018), XP080862490, Section I 'III and IV.

* cited by examiner

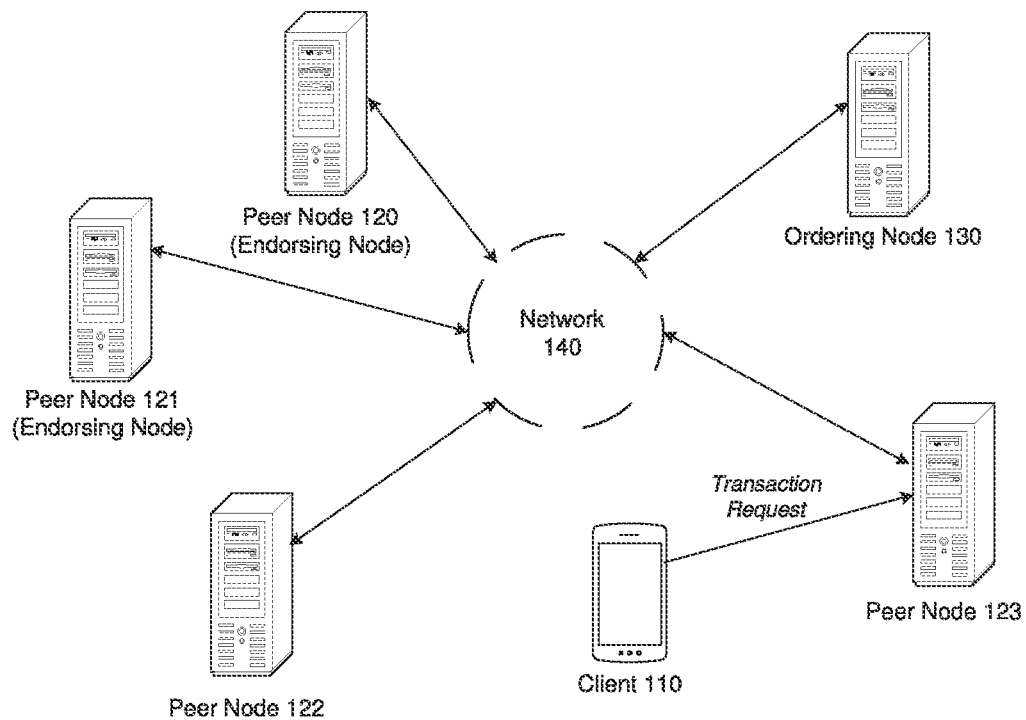

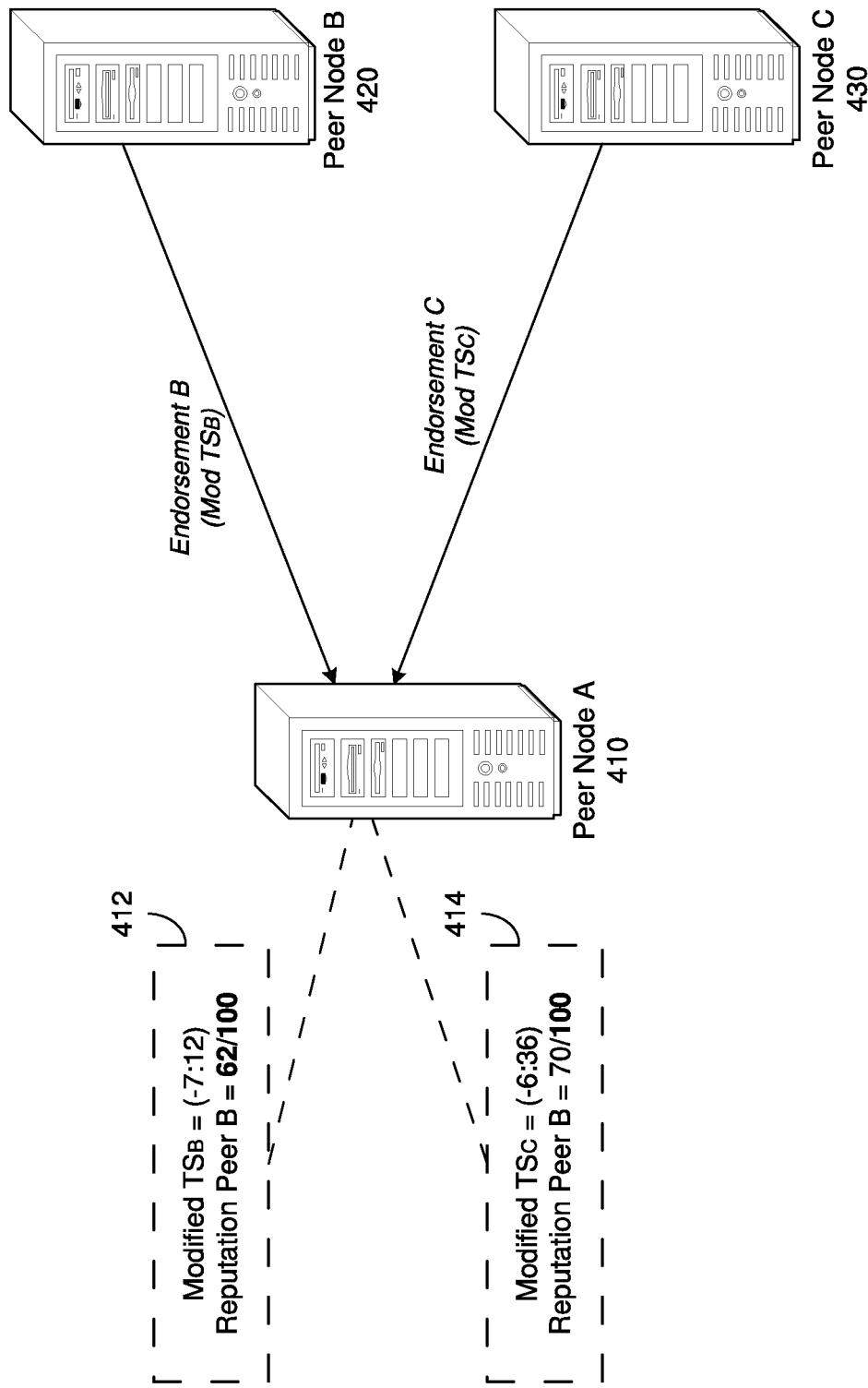

BLOCKCHAIN TIMESTAMP AGREEMENT

TECHNICAL FIELD

This application generally relates to a database storage system, and more particularly, to a decentralized database such as a blockchain in which timestamp information of a blockchain request is validated prior to storing the blockchain request.

BACKGROUND

A centralized database stores and maintains data in one single database (e.g., database server) at one location. This location is often a central computer, for example, a server computer, a computer in a cloud service, or a mainframe computer. Information stored on a centralized database is typically accessible from multiple different points. Multiple users or client workstations can work simultaneously on the centralized database, for example, based on a client/server configuration. Because of its single location, a centralized database is easy to manage, maintain, and control, especially for purposes of security. Within a centralized database data integrity is maximized and data redundancy is minimized as a single storing place of all data also implies that a given set of data only has one primary record. This aids in the maintaining of data as accurate and as consistent as possible and enhances data reliability.

However, a centralized database suffers from significant drawbacks. For example, a centralized database has a single point of failure. In particular, if there is no fault-tolerance setup and a hardware failure occurs, all data within the database is lost and work of all users is interrupted. In addition, a centralized database is highly dependent on network connectivity. As a result, the slower the Internet connection, the longer the amount of time needed for each database access. Another drawback is that bottlenecks occur when the centralized database experiences of high traffic due to the single location. Furthermore, a centralized database provides limited access to data because only one copy of the data is maintained by the database. As a result, multiple users may not be able to access the same piece of data at the same time without creating problems such as overwriting stored data. Furthermore, because a central database system has minimal to no data redundancy, if a set of data is unexpectedly lost it is difficult to retrieve it other than through manual operation from back-up disk storage.

A decentralized database such as a blockchain system provides a storage system capable of addressing the drawbacks of a centralized database. In a blockchain system, each of multiple peer nodes store a replica of the identical ledger as a distributed ledger, often called a blockchain. Clients interact with peer nodes to gain access to the blockchain. The peer nodes may be controlled by different entities having different interests and therefore are not trusting entities with respect to one another. Furthermore, there is no central authority in a blockchain. Therefore, in order for data to be added to or changed on the distributed ledger in a trusted manner, a consensus of peer nodes must occur. The consensus provides a way for trust to be achieved in a blockchain system of untrusting peer nodes.

To conduct exchanges or otherwise store data via the blockchain, a client may submit a request (e.g., a transaction, etc.) to a peer node. The requests should be processed and recorded in the blockchain in the order they are submitted, but it is difficult to ensure a fair ordering because there is no mechanism to agree on the time across multiple nodes as the system clock of nodes may not be fully synchronized each other, and there are network latencies between the nodes. In addition, since nodes belong to different entities that may not behave honestly with respect to each other, each node may try to gain an advantage/benefit by ordering their own requests earlier than others.

For example, in financial markets, the time priority and the price priority are the principle for fair trades. The time priority is one of the rules for processing sell order and buy orders at a Stock Exchange. It means that when multiple orders are placed for the same equity at the same price, the sell/buy orders placed earlier shall be matched with the corresponding sell/buy order, and executed as a trade. If the matching of the sell/buy orders are processed by a centralized system, then the system can sequentially process each order to respect the time priority. However, in a decentralized system, orders may be processed by multiple systems in parallel, during which the sequence of orders may not be correctly controlled. Inability to ensure the correct ordering will cause unfairness that is not acceptable in the market practice.

The request includes a timestamp which indicates the time the request was submitted by the front-end application. The timestamp should be used as a basis for ordering the request among multiple requests. When used properly, a timestamp ensures that fairness is provided to the transaction when multiple transactions interact with the same resource. However, a blockchain is subject to fraud. For example, an application node can be hijacked, or completely replaced. Such an application behave dishonestly and put a timestamp that is earlier than the real timestamp, so that the request can be ordered earlier than the requests submitted by applications that belong to other entities. As another example, a peer node may deliberately neglect and delay the consensus making process of requests from other entities so that those requests will be ordered later than its own entity's requests. Accordingly, what is needed is a time management mechanism within a blockchain that ensures trust and prevents fraudulent activity within the blockchain network.

SUMMARY

One example embodiment may provide a computing system that includes one or more of a network interface configured to receive a blockchain request from a client application, and a processor configured to one or more of determine a network latency between the client application and the endorsing node based on a network path between the client application and the endorsing node, extract a timestamp from the blockchain request, determine whether the extracted timestamp is invalid based on the network latency between the client application and the endorsing node, and in response to a determination that the timestamp is valid, generate an endorsement for the blockchain request and control the network interface to transmit the endorsement to the client application.

Another example embodiment may provide a method that includes one or more of receiving a blockchain request from a client application, determining a network latency between the client application and the endorsing node based on a network path between the client application and the endorsing node, extracting a timestamp from the blockchain request, determining whether the extracted timestamp is invalid based on the network latency between the client application and the endorsing node, and in response to determining that the timestamp is valid, generating an endorsement for the blockchain request and transmitting the endorsement to the client application.

A further example embodiment may provide a non-transitory computer readable medium comprising instructions, that when read by a processor, cause the processor to perform one or more of receiving a blockchain request from a client application, determining a network latency between the client application and the endorsing node based on a network path between the client application and the endorsing node, extracting a timestamp from the blockchain request, determining whether the extracted timestamp is invalid based on the network latency between the client application and the endorsing node, and in response to determining that the timestamp is valid, generating an endorsement for the blockchain request and transmitting the endorsement to the client application.

A further example embodiment may provide a computing system that includes one or more of a network interface configured to receive a blockchain request from a client application, and a processor configured to one or more of extract a timestamp from the blockchain request, determine whether or not the extracted timestamp is incorrect based on a network latency determined between the client application and the endorsing node by the endorsing node, and in response to a determination that the extracted timestamp is incorrect, determine a correct timestamp for the blockchain request, modify the blockchain request via replacement of the extracted timestamp with the correct timestamp, and control the network interface to transmit the blockchain request with the corrected timestamp to the client application.

A further example embodiment may provide a method that includes one or more of receiving a blockchain request from a client application, extracting a timestamp from the blockchain request, determining whether or not the extracted timestamp is incorrect based on a network latency determined between the client application and the endorsing node determined by the endorsing node, and in response to a determination that the extracted timestamp is incorrect, determining a correct timestamp for the blockchain request, modifying the blockchain request by replacing the extracted timestamp with the correct timestamp, and transmitting the blockchain request with the corrected timestamp to the client application.

BRIEF DESCRIPTION OF THE DRAWINGS

FIG. 1 is a diagram illustrating of a blockchain network for timestamp agreement, according to example embodiments.

FIG. 4B is a diagram illustrating a process of a client peer node generating a reputation value, according to example embodiments.

DETAILED DESCRIPTION

Figure 2A:
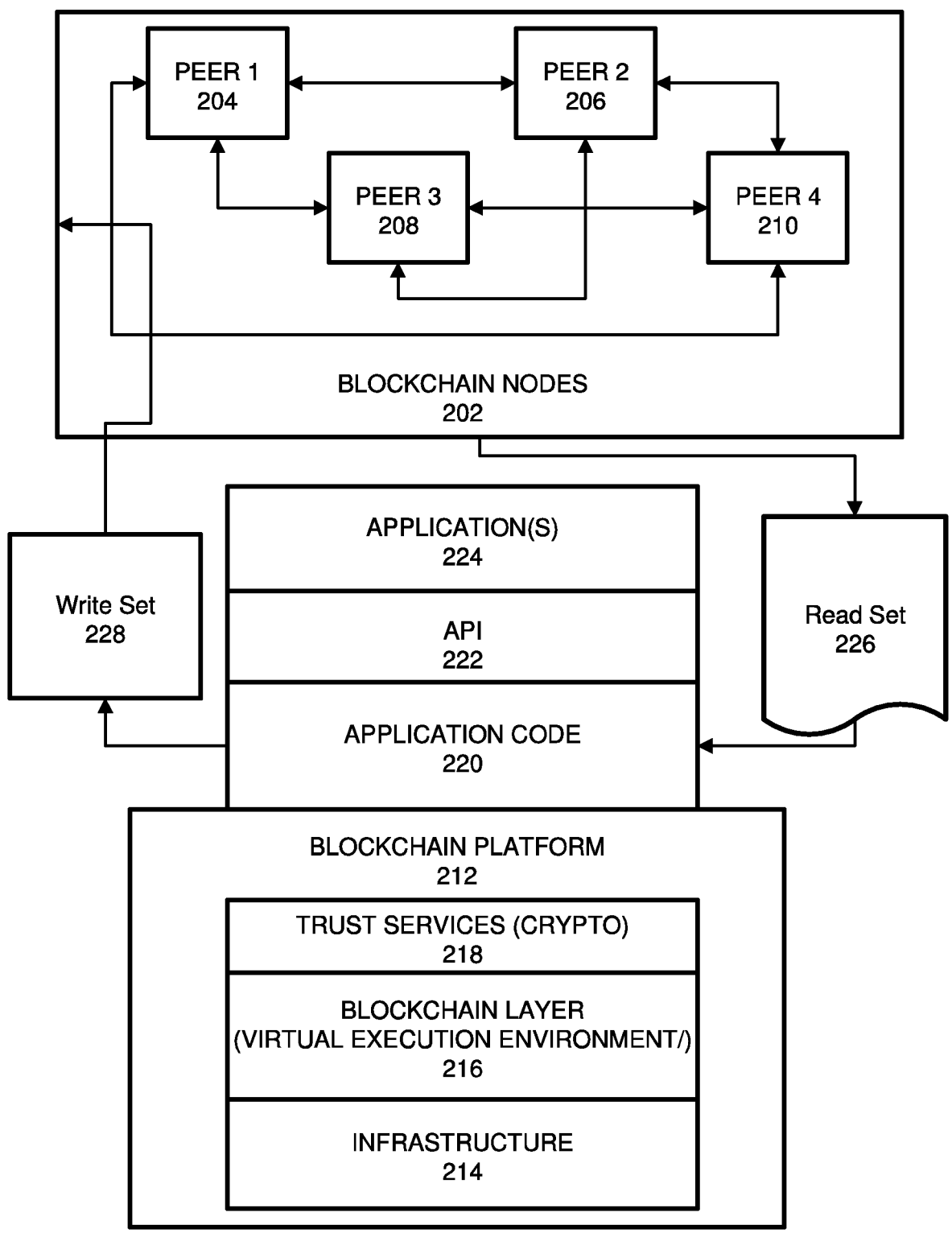
FIG. 2A is a diagram illustrating a peer node blockchain architecture configuration for an asset sharing scenario, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, non-transitory computer readable media, devices, and/or networks, which provide a blockchain network which evaluates timestamp information within blockchain requests (e.g., transactions, etc.) for falsified timestamps. Furthermore, the blockchain network can modify falsified timestamp information and store the transaction based on the corrected timestamp information. In some embodiments, the network may reduce a reputation of a peer node that is falsifying timestamps such that the peer node is highly scrutinized by the network when submitting new transactions and/or when endorsing transactions submitted by other peer nodes.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on a proof of work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

When transactions or other requests (process, storage, etc.) are processed by a single system such as a centralized database, the system can sequentially process each order to respect the time priority based on when the centralized system received the request. However, in parallel processing systems, requests can be processed by multiple systems in parallel, during which the sequence of orders may change. Such parallelism may cause unfairness that is not acceptable in the market practice. In order to ensure fairness, orders should be ordered based on a time when the order was accepted by the application.

However, it is difficult to ensure application's timestamp's correctness in distributed ledger technology (DLT) such as blockchain, because peer nodes (i.e., client application, peer (endorser), and orderers, etc.) behave asynchronously in parallel. Furthermore, each node may belong to different organizations. As a result, timestamps may be falsified or otherwise generated in error. For example, an application (client node) may put an arbitrary incorrect timestamp on a transaction in order to have higher time priority on a transaction. As another example, an endorser peer may delay the response to transaction proposals from other peers, in order to get relative advantage on the transactions issued by the application in the same organization as the peer.

The example embodiments overcome these drawbacks by providing a blockchain network which evaluates timestamp information within blockchain requests (e.g., transactions, etc.) for falsified timestamps. Furthermore, the blockchain network can modify falsified timestamp information and store the transaction based on the corrected timestamp information. In some embodiments, the network may reduce a reputation of a peer node that is falsifying timestamps such that the peer node is highly scrutinized by the network when submitting new transactions and/or when endorsing transactions submitted by other peer nodes. As described herein, falsified timestamps may refer to intentionally incorrect timestamps added to a request or it may include a message that has been intentionally delayed to create an actual timestamp that is too late and therefore unfair.

Some benefits of the instant solutions described and depicted herein include an improvement to the accuracy of timing (timestamp) which is given to a transaction in a distributed ledger technology. In doing so, the system creates fairness of order even when the ledger has untrusting members such as in a blockchain. Timestamp information may be monitored and evaluated by endorsing peer nodes. If the endorsing node determines a timestamp value has been falsified by a submitting node the endorsing node may change the timestamp value to a corrected value. The endorsing node may determine whether a timestamp has been falsified based on a network latency measured between the endorsing node and the submitting peer node. Furthermore, the endorsing node may determine a proposed timestamp for the transaction based on the network latency and compare this value to the timestamp provided from the submitting node. If the proposed timestamp and the submitted timestamp differ by more than a threshold value, the endorsing node may change the timestamp value to the proposed timestamp.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the timestamp fairness is implemented using the endorsement, consensus, and distributed properties of a blockchain which are inherent and unique to blockchain. In particular, the system does not rely solely on the opinion/determination by the endorsing peer nodes. Instead, the submitting peer node may receive the modified timestamps and generate reputation values for the endorsing peer nodes when the submitting peer node determines that the endorsing peer node has added an incorrect timestamp to the transaction. This can ensure balance between the endorsing peer nodes and the submitting peer nodes.

Furthermore, the submitting peer node may transmit the transaction for inclusion within the blockchain to an ordering node. The ordering node may evaluate the original timestamp provided by the submitting nodes, the modified timestamps submitted by the endorsing nodes, the reputations of the endorsing nodes, and the like, and determine a final timestamp for the transaction. In some embodiments, the ordering node may generate the final timestamp based on a weighted average or weighted combination of the timestamps provided by the endorsing peer nodes and/or the submitting peer node. The final timestamp may be used to order the transaction with a group of transactions in a data block.

There are multiple consensus mechanisms adopted by blockchain platforms. The proposed solution is designed on top of a consensus mechanism such as a consensus mechanism of Hyperledger Fabric, or the like, where a blockchain network comprises client applications, peer nodes, and ordering service nodes. A client application is a front-end service that submits a request to the blockchain network. A peer node is a node that manages a replica of the distributed ledger. Some of the peer nodes are called endorsing nodes (or endorsing peers), which receives requests from client applications, validate the request, and returns its endorsement to the client application. Each endorsement is a digitally signed message that includes the original request, and its validity as validated by the endorsing node, and any other information. The ordering service nodes are the special nodes responsible for uniformly ordering the requests in the blockchain network. Each of the client applications and peers belong to one of the organizations (or entities) that are participant of the blockchain network.

In the Hyperledger Fabric's mechanism, the consensus is made in the following manner. First, a client application sends a request to one or more endorsing nodes, and receive the endorsements. The endorsement policy is pre-defined for each type of request, to determine how many request from which organization is required for a request to be valid. Therefore, the client application collects enough number of endorsements from one or more endorsing peers that belong to one or more organizations. Second, after collecting enough endorsements, the client application submits the request, along with collected endorsements, to the ordering service. Third, the ordering service node receives requests from multiple client applications, order them in a uniform manner, and deliver to the peer nodes. Four, then each peer node receive the requests and store it into its own replica of the distributed ledger. This mechanism ensures that the requests are totally ordered in the same order in the all the copies of the peers in the blockchain network.

In the original consensus mechanism of Hyperledger Fabric, endorsing peers are responsible only to evaluate the transaction content and deriving resulting read-write sets, while the ordering peer(s) are responsible to order the transactions in a fair manner. The proposed idea extends the current consensus mechanism, so that the consensus about the transaction arrival timing is made in a decentralized manner. It also considers a possibility that each endorsing peer and submitting peer (e.g., client application, etc.) may not behave honestly, by respecting decentralized nature of blockchain. The system herein improves the chronological ordering of transactions within a blockchain.

FIG. 1 illustrates a blockchain network 100 for timestamp agreement of blockchain transactions, according to example embodiments. Referring to FIG. 1, the blockchain network 100 includes a plurality of peer nodes 120-123 and an ordering node 130 which communicate via a network 140 such as the Internet, a private network, and/or the like. Here, the peer nodes 120-123 may correspond to different untrusting entities, but embodiments are not limited thereto. Each peer node 120-123 may be capable of acting as a submitting node (client node) for submitting transactions for storage on a blockchain. The blockchain may be stored within a distributed ledger which is replicated among all of the peer nodes 120-123. Each of the peer nodes 120-123 may also be capable of acting as an endorsing node.

In the example of FIG. 1, a client 110 submits a transaction request to peer node 123 for execution and storage within the blockchain managed by the blockchain network 100. The transaction may be forwarded to endorsing peer nodes 120 and 121 which may be predefined by one or more endorsement policies. The transaction is provided from the peer node 123 to the endorsing peer nodes 120 and 121 and includes a timestamp representing when the transaction was submitted to the peer node 123. However, if the peer node 123 were to act in bad faith, the peer node 123 may decrease the timestamp (i.e., reduce the time, etc.) to improve the order of the client transaction such that it is earlier in time thereby providing a possibility of beating out or coming before another submitted transaction associated with a same item or asset stored on the blockchain.

Therefore, each of the endorsing peer nodes 120 and 121 may evaluate the timestamp added by the peer node 123. For example, the peer nodes 120-123 may each include a monitoring thread that routinely measures network latency values between the respective peer nodes 120-123. Accordingly, each peer node may maintain a table of network latency values between the respective peer node and the other peer nodes in the blockchain network. The network latency values may be updated randomly, periodically, etc., based on the thread to reflect the current and updated network conditions over time. Based on a network latency between an endorsing peer node (e.g., peer node 120) and the submitting node 123 the endorsing peer node may determine its own proposed timestamp for when the transaction was submitted by the client 110 to the submitting peer node 123. In other words, the endorsing peer node may check whether the timestamp added by the submitting peer node 123 is accurate based on current network latency conditions. If the original timestamp deviates from the proposed timestamp, the endorsing peer node may determine that the original timestamp is invalid, incorrect, falsified, an error, or the like. In any case, the endorsing peer node may modify the timestamp, endorse the transaction, and send the transaction back to the submitting peer node 123. This process may be performed by all endorsing peer nodes (e.g., 120 and 121) for each transaction.

The peer node 123 may detect whether the timestamp has been modified by the endorsing peer nodes 120 and/or 121. In case the timestamp has been modified, the peer node 123 may determine reputation values for the endorsing peer nodes 120 and 121 based on a change in the timestamp value. In case one endorsing peer node is acting in bad faith, the other peer nodes will likely have similar timestamp values as the original timestamp provided by the submitting peer node 123. However, if the submitting peer node 123 is acting in bad faith, all of the timestamp values from the endorsing peer nodes will be modified. Accordingly, when the final transaction proposal is sent to the ordering node 130, the ordering node 130 can readily determine whether the timestamp provided by the submitting peer node 123 should be given more weight or whether the timestamps provided by the endorsing nodes 120 and 121 should be given more weight. In some cases, the ordering node may give each of the timestamps a weight and determine the final timestamp based on a weighted combination of the timestamps from the submitting peer node 123, and the endorsing peer nodes 120 and 121. Here, each node 120, 121, and 123 may be given a different respective weight.

In some embodiments, an endorsing peer node may decline to endorse a transaction when it is clear that the submitting peer node has falsified the timestamp (i.e., the proposed timestamp significantly differs from the original timestamp.) In this case, the transaction may not be adequately endorsed and will not be added to a block within the blockchain.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the read set 226 may be processed by one or more processing entities (e.g., virtual machines) included in the blockchain layer 216. The write set 228 may include changes to key values. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
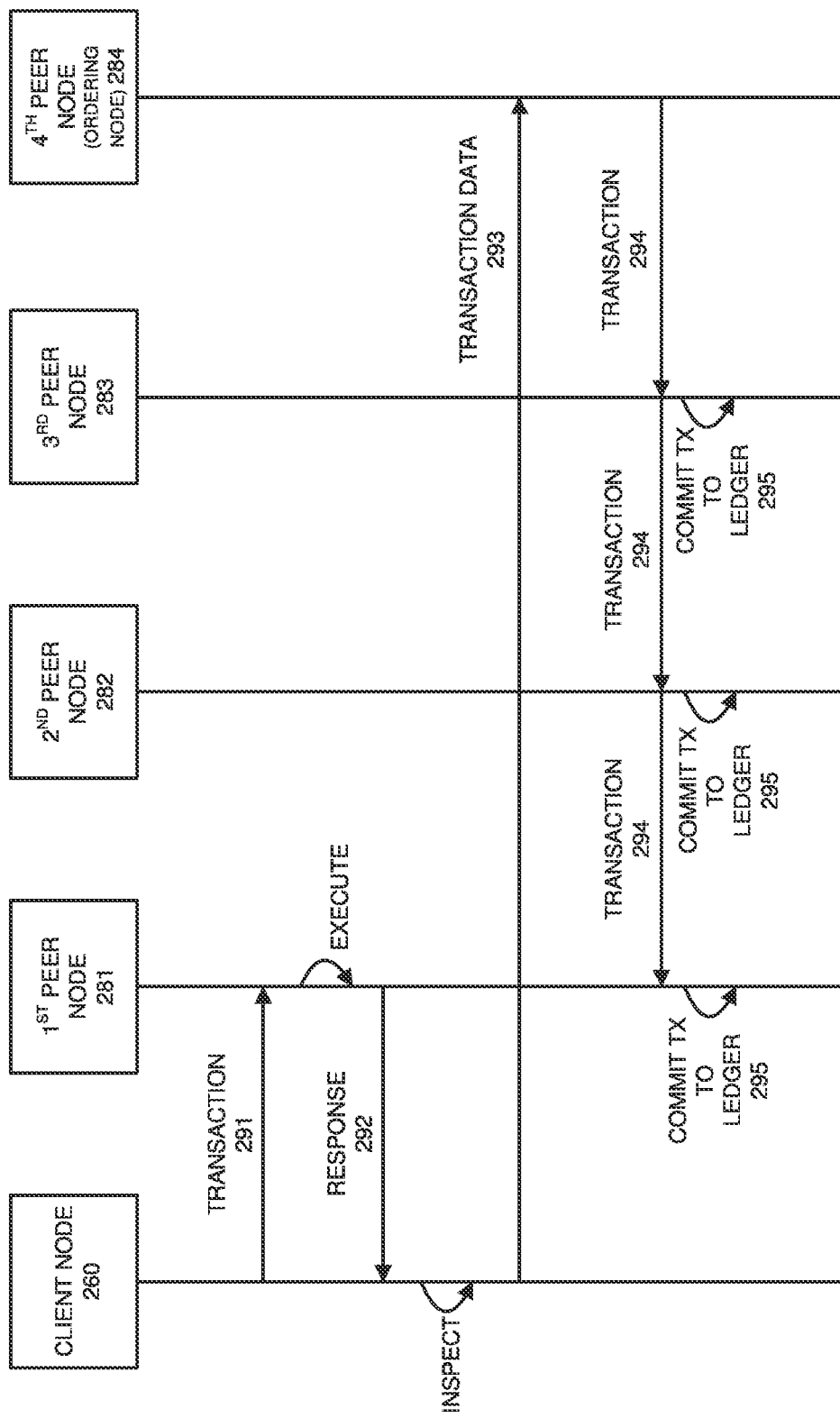
FIG. 2B is a diagram illustrating a peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

The client node 260 may initiate the transaction 291 by constructing and sending a request to the peer node 281, which is an endorser. There may be more than one endorser, but one is shown here for convenience. The client 260 may include an application that leverages a supported software development kit (SDK), such as NODE, JAVA, PYTHON, and the like, which utilizes an available API to generate a transaction proposal. The transaction proposal 291 is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, (d) that the submitter (client 260, in the example) is properly authorized to perform the proposed operation on that channel, and (e) the original timestamp is valid, or otherwise modify the timestamp to be correct. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID, as well as the timestamp information and reputation information described herein. The ordering node 284 does not need to inspect the entire content of a transaction in order to perform its operation, instead the ordering node 284 may simply receive transactions from all channels in the network, determine a final timestamp for each transaction, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
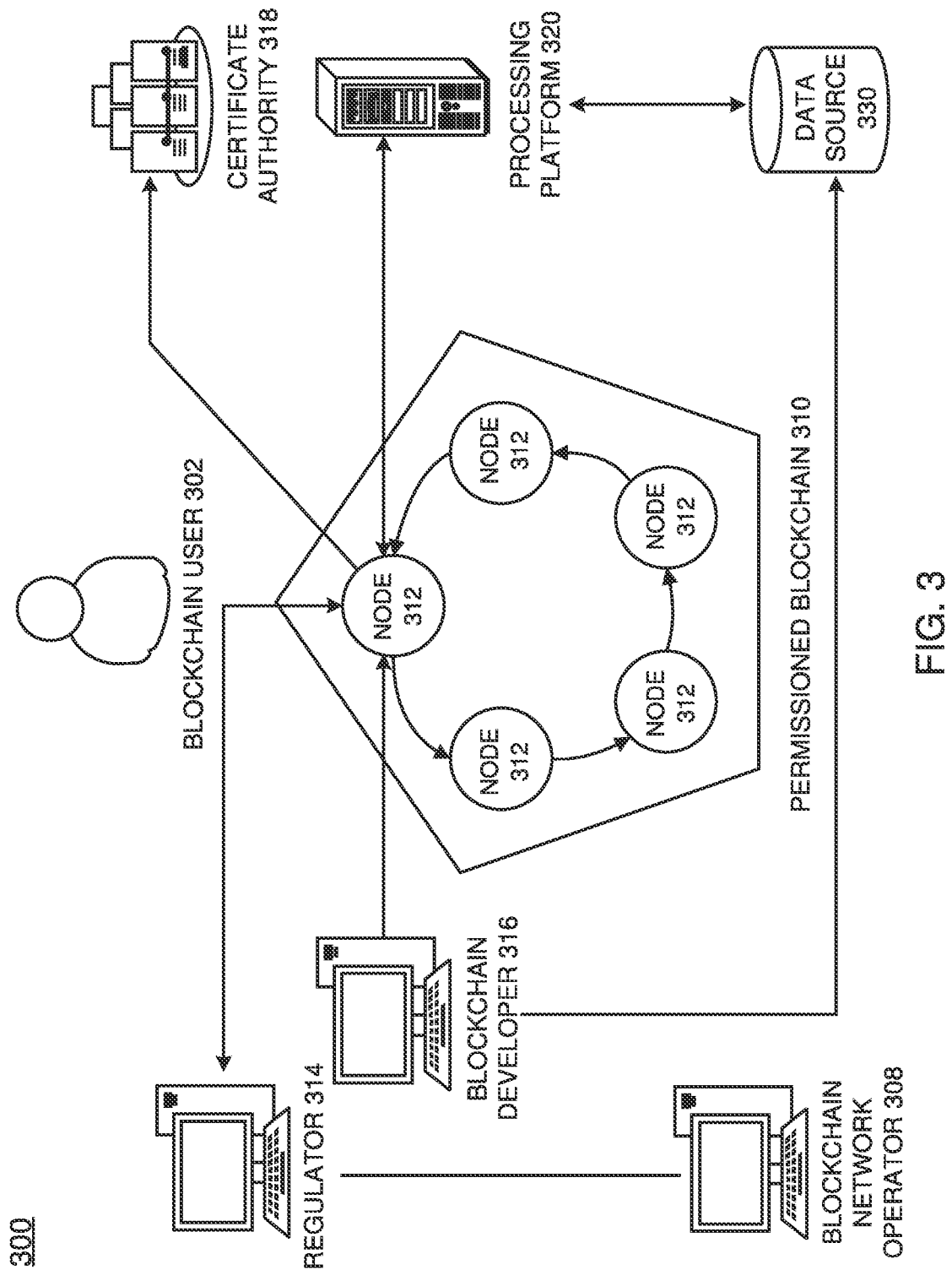
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4A:
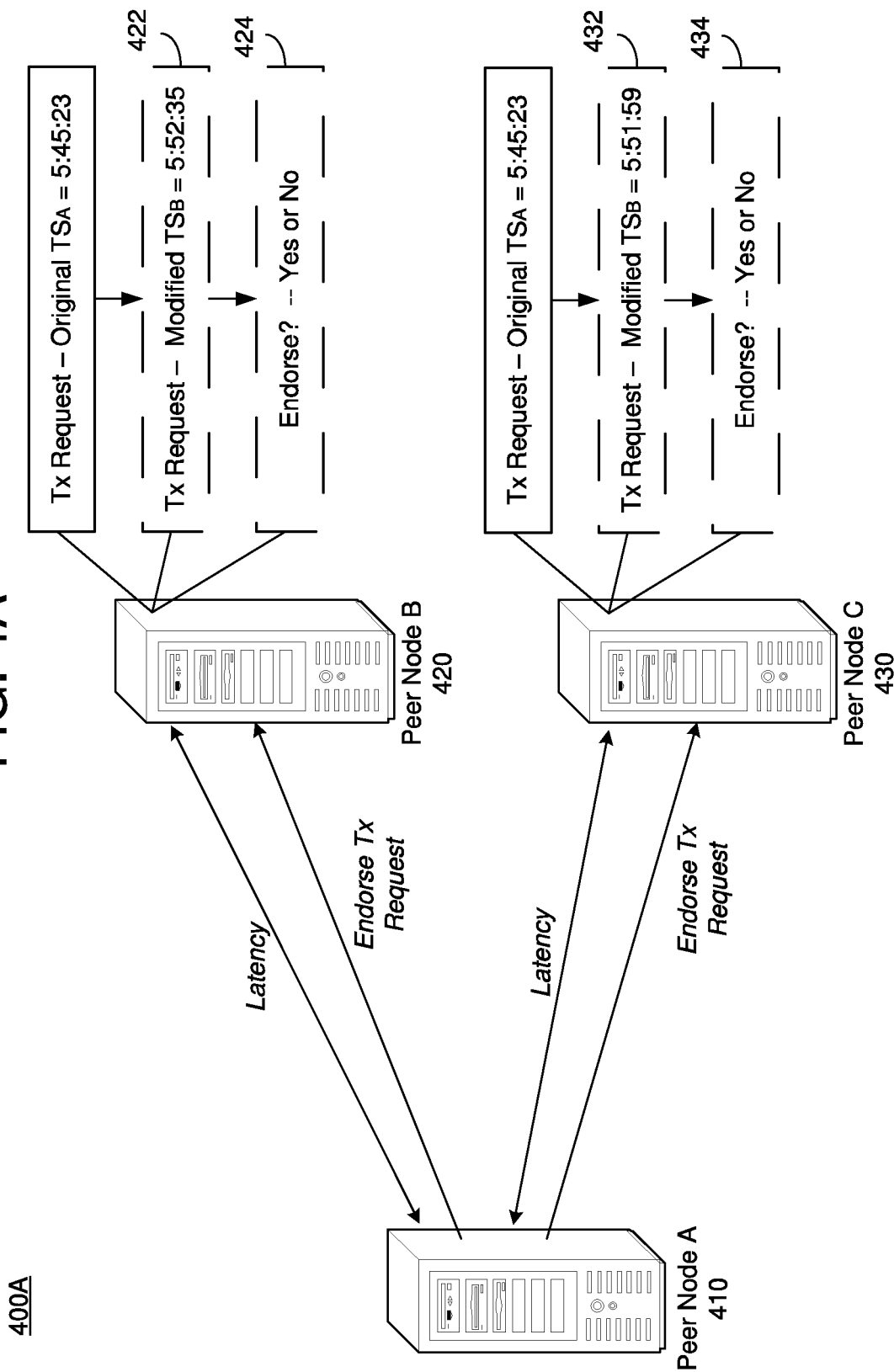
FIG. 4A is a diagram illustrating a process of an endorsing peer node modifying a timestamp, according to example embodiments.

FIG. 4A illustrates a process 400A of an endorsing peer node modifying a timestamp, according to example embodiments. Referring to FIG. 4A, client peer node A 410 submits a transaction from a client for endorsement by peer node B 420 and peer node C 430. In response, each endorsing peer (e.g., peer node A 420 and peer node B 430, etc.) may perform the following steps to attempt to endorse the transaction proposal $tx_1$. For example, each peer may measure a network latency between the respective peer and the peer node A 410 (i.e., $L_{a-pj}$) by using other means (e.g., ICMP, etc.) Each peer may record the time stamp $r_{ji}$ when the endorsing peer receives a transaction proposal $tx_i$. Then calculate $r_{ji}-a_i$ as the estimated network latency between the client peer node A 410 and itself. Here, if estimated network latency is bigger than the pre-measured network latency, and the difference is bigger than the acceptable error (i.e., $r_{ji}-a_i-L_{a-pj}>err$), the respective endorsing peer may determine that the peer node A 410 has put a falsified timestamp on the transaction. In response, the endorsing peer may correct or modify the timestamp based on a proposed new timestamp, in 422 and 432, and/or may determine whether to reject the transaction proposal by either endorsing it or not endorsing it, in 424 and 434.

In the example of FIG. 4A, the endorsing peer node B 420 and the endorsing peer node C 430 each determine to endorse the transaction in 424 and 434, respectively. Prior to endorsing the transaction, the endorsing peer may determine a proposed or modified timestamp. To determine a modified timestamp the endorsing peer may estimate that the correct timestamp of $tx_i$ at the peer node A based on its own timestamp created when the endorsement request was received minus network latency (i.e., $p_{ji}=r_{ji}-L_{a-pj}$). After executing the chaincode, the peer attach the estimated timestamp ($p_{ji}$) to the endorsement and forward the endorsement back to the client node A 410.

According to various embodiments, each endorser may consider network latency because each endorser receives a transaction of the client application directly from the peer node where the transaction was generated, so that it can (and aims to) evaluate the correctness of client application's timestamp. Therefore, to be accurate it is necessary to consider the network latency between the client application and the endorsing peer. On the other hand, some peer may be unfair and try to delay some client application's transactions. The orderer (shown in FIG. 4C) is trying to avoid such situation by considering reputation of endorsing peers. In some embodiments, the network latency may be determined by the endorsing peer itself. For example, a new network latency monitor thread may be implemented which regularly measures network latency between the endorsing peer and the other peer nodes of the network by using the ICMP protocol (i.e., ping) and storing it such as in an in-memory store or file.

In some embodiments, each endorsing peer may define a threshold for deviation of timestamp. As a non-limiting hypothetical example, the threshold may be 10 seconds. In this example, the endorsing peer (i) may reject endorsement if the deviation of timestamp is larger than 10 seconds, and (ii) fix the timestamp otherwise. Actually (i) can be optional and the peer can always fix timestamp. But the reason the peer has option for (i) may be when a peer determines that a client application is putting a falsified timestamp and behaving unfairly.

Figure 4C:
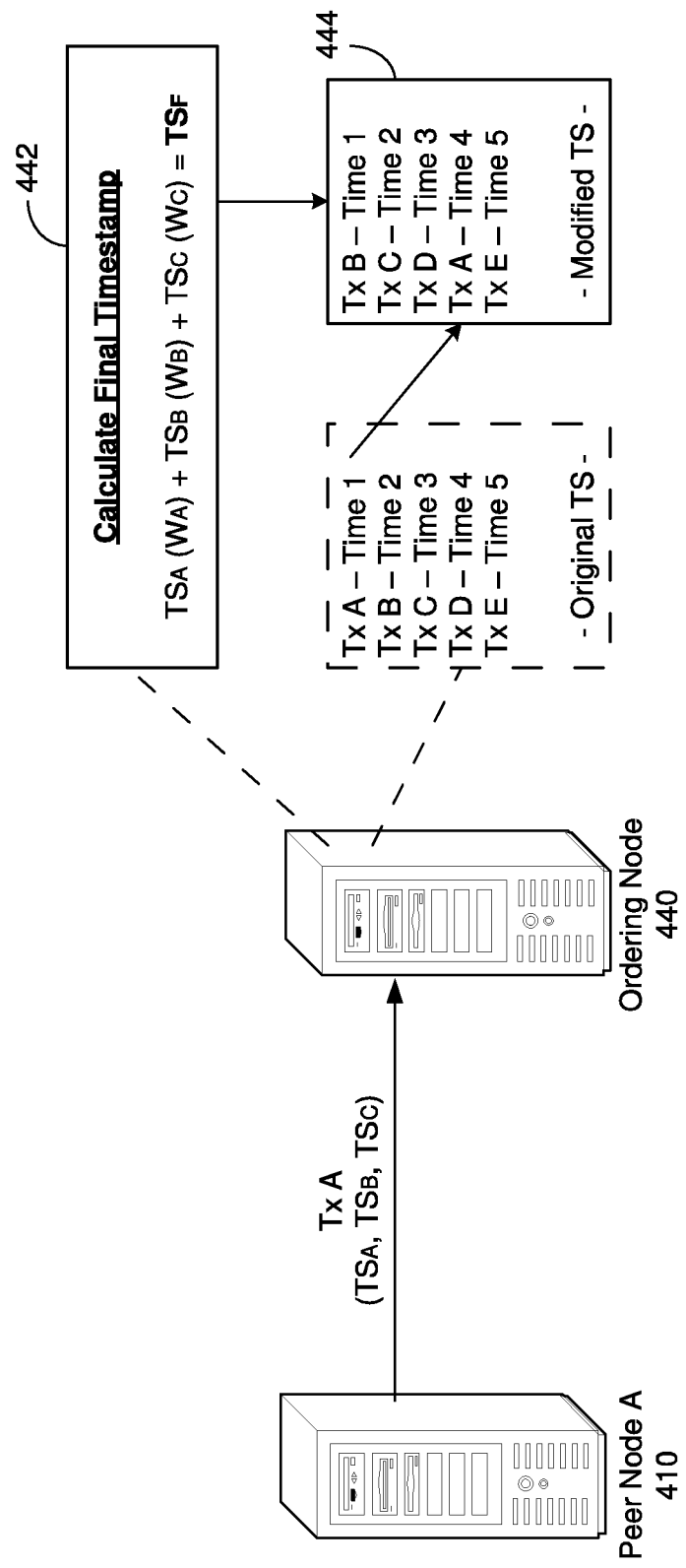
FIG. 4C is a diagram illustrating a process of an ordering node determining a final timestamp, according to example embodiments.

FIG. 4B illustrates a process 400B of a client node A 410 generating a reputation value, according to example embodiments, and FIG. 4C illustrates a process 400C of an ordering node determining a final timestamp, according to example embodiments. In this example, both of the endorsing node B 420 and endorsing node C 430 endorse the transaction submitted by client node A 410 with modified timestamps calculated at respective nodes. In response, the client node A 410 may identify the modified timestamp and generate a reputation value for each of the endorsing nods. For example, the client node A 410 may determine that the endorsing peer's estimated timestamp in the endorsement ($p_{ji}$) and app's timestamp ($a_i$) are different, and their difference ($p_{ji}-a_i$) is larger than a threshold. In this case, the client node A 410 may generate and attach a negative reputation 412 and 414 for the endorsing peers 420 and 430 to the transaction. Likewise, the client node 410 A may attach a peer's negative reputation when endorsement is rejected wrongly.

The endorsement policy of the blockchain network including peers A, B, and C, defines how many endorsements are required to commit each transaction. Therefore, if the client node A 410 receives enough endorsements even excluding any rejecting endorsing peers, it can still submit the transaction to an ordering node 440 as shown in FIG. 4C. Then the ordering node 440 may order transactions based on timestamps and generate a data block with the ordered transactions. Furthermore, the ordering node 440 may deliver the block with the ordered transactions to each peer (A, B, and C, etc.) for storage on the distributed ledger. Then each peer will check whether each of transactions have enough endorsements according to the endorsement policy and commit the transaction to the ledger.

Referring again to FIG. 4B, the client node A 410 may determine the reputation of each of the respective endorsing peers A 420 and B 430 and send it to the ordering node 440 which may use the peer reputations for determining a final timestamp 442. In some embodiments, to share the reputation among peers, the reputations can be stored in a ledger data which will automatically be propagated to the all the peers that have the same ledger.

The client node A 410 may decides each peer's reputation by comparing the difference between the client node A 410's timestamp on $tx_i$ ($a_i$) and the endorsing peer's timestamp such as peer node A 420 and peer node B 430. The client node A 410 may assign a lower reputation to a peer when the timestamp difference is bigger than average of all the peers. In this example, when calculating the average, the client node A 410 may ignore peers which timestamp difference compared to the client node A 410's timestamp is bigger than the allowable error.

The following is example steps to calculate the reputation by the client node A 410. (this is just one example and other approaches are possible)

Let $rep_j$ be the reputation of $peer_j$, represented by a number between 0 and 1 (i.e., 1 is the highest). Let err be an allowable error. Obtain $p_{i-ave}$ as average of timestamp on $tx_i$ by peers $p_j$(j=1 . . . k) but after removing all $p_{ji}$ where $(p_{ji}-a_i)$>err. Obtain s as the standard deviation of $p_j$(j=1 . . . k) but after removing all $p_{ji}$ where $(p_{ji}-a_i)$>err. $rep_j=(p_{ji}-p_{j-ave})/s$ if $rep_j$<0, then $rep_j=0$.

FIG. 4C illustrates a process 400C of the ordering node 440 determining a final timestamp 442 and arranging transactions in a group 444 based on the modified final timestamp value for a transaction among the group 444, according to example embodiments. In the example of FIG. 4C, the ordering node 440 may determine its own timestamp $o_i$ for $tx_i$. In this example, the ordering node 440 may calculate its timestamp $o_i$ as the weighted average of client node A 410's timestamp $a_i$ and endorsing peers' timestamp ($p_{1i}$, $p_{2i}$, . . . ), where the weight is determined from the reputation of each peer. There may be multiple types of reputation including a reputation of $peer_j$ for each transaction ($rep_j$) and accumulated reputation ($REP_j$). The ordering node 440 may give a penalty to a transaction that was sent from client node, which belongs to the same organization as peers with a bad reputation. Penalty can be given as a small weight to the app's timestamp.

The Orderer may order or otherwise arrange transactions according to $o_i$. (transactions with smaller $o_i$ will be placed at an earlier position in the queue) In this example, the ordering node 440 may move a transaction out of its original order and into a new modified order as shown in block 444 based on a difference between the original timestamp provided by the client node A 410 and the final timestamp 442 created by the ordering node 440. The ordering node 440 may obtain the timestamp $O_i$ by calculating the average of timestamp by the app and peers. The orderer may also use the reputation of each peer as the weight, so the peer's timestamp with lower reputation have less impact to the average. The following is example steps to calculate the timestamp $O_i$. (this is just one example and other approaches are possible) Obtain $p_{i-ave}$ as average of timestamp on $tx_i$ by peers $p_j$(j=1 . . . k). Let n be the number of peers that provided endorsement to $tx_i$.

$$O_i = p_{i-ave} + \left(\sum_{j=1}^{k}(p_{ji}-p_{i-ave})*rep_i*REP_i\right)/n_i.$$

Figure 5A:
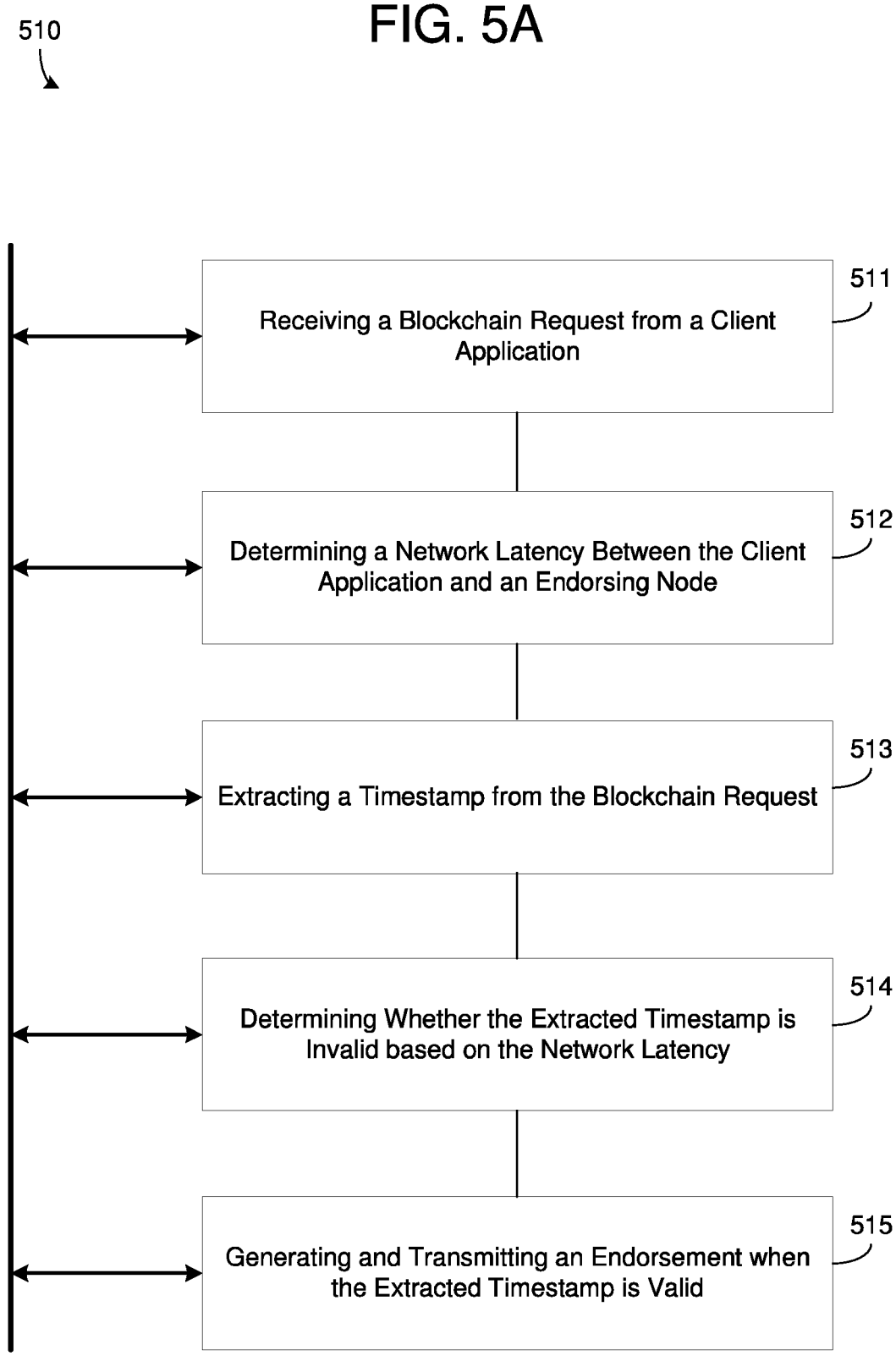
FIG. 5A is a diagram illustrating a method of endorsing a blockchain transaction based on a timestamp, according to example embodiments.

FIG. 5A illustrates a method 510 of endorsing a blockchain transaction based on a timestamp, according to example embodiments. For example, the method 510 may be performed by a client application within a blockchain network. Referring to FIG. 5A, in 511 the method may include receiving a blockchain request from a client (also referred to as a client peer node or client node). For example, the blockchain request may include a transaction that is to be endorsed by one or more peer nodes within the blockchain network. In 512, the method may include determining a network latency between the client application that submitted the transaction and the endorsing node performing the method based on a network path between the client application (or system hosting the client application) and the endorsing node. Here, the network latency may be measured by a monitoring thread running on the endorsing peer node which periodically or randomly measures network latency between the endorsing node and other peer nodes in the blockchain network and stores the latency values in a table or file that is maintained within a memory of the endorsing peer node.

In 513, the method may include extracting a timestamp from the blockchain request. For example, the timestamp may be included within a header or data section of a blockchain message and may be added to the message by the peer node that submitted the transaction for endorsement. In 514, the method may include determining whether the extracted timestamp is invalid based on the network latency between the client application and the endorsing node. Furthermore, in 515, the method may include, in response to determining that the timestamp is valid, generating an endorsement for the blockchain request and transmitting the endorsement to the client application. In some embodiments, in response to determining that the timestamp is invalid, the method may further include declining to endorse the blockchain request. In some embodiments, the method may further include simulating the blockchain request and generating the endorsement in response to the timestamp being determined as valid and the blockchain request being simulated successfully.

According to various embodiments, the determining whether the extracted timestamp is invalid may include estimating a timestamp for the blockchain request based on the network latency and determining whether the extracted timestamp is within a predefined threshold of the estimated timestamp. In some embodiments, the determining whether the extracted timestamp is invalid may include determining whether the extracted timestamp is too early.

Figure 5B:
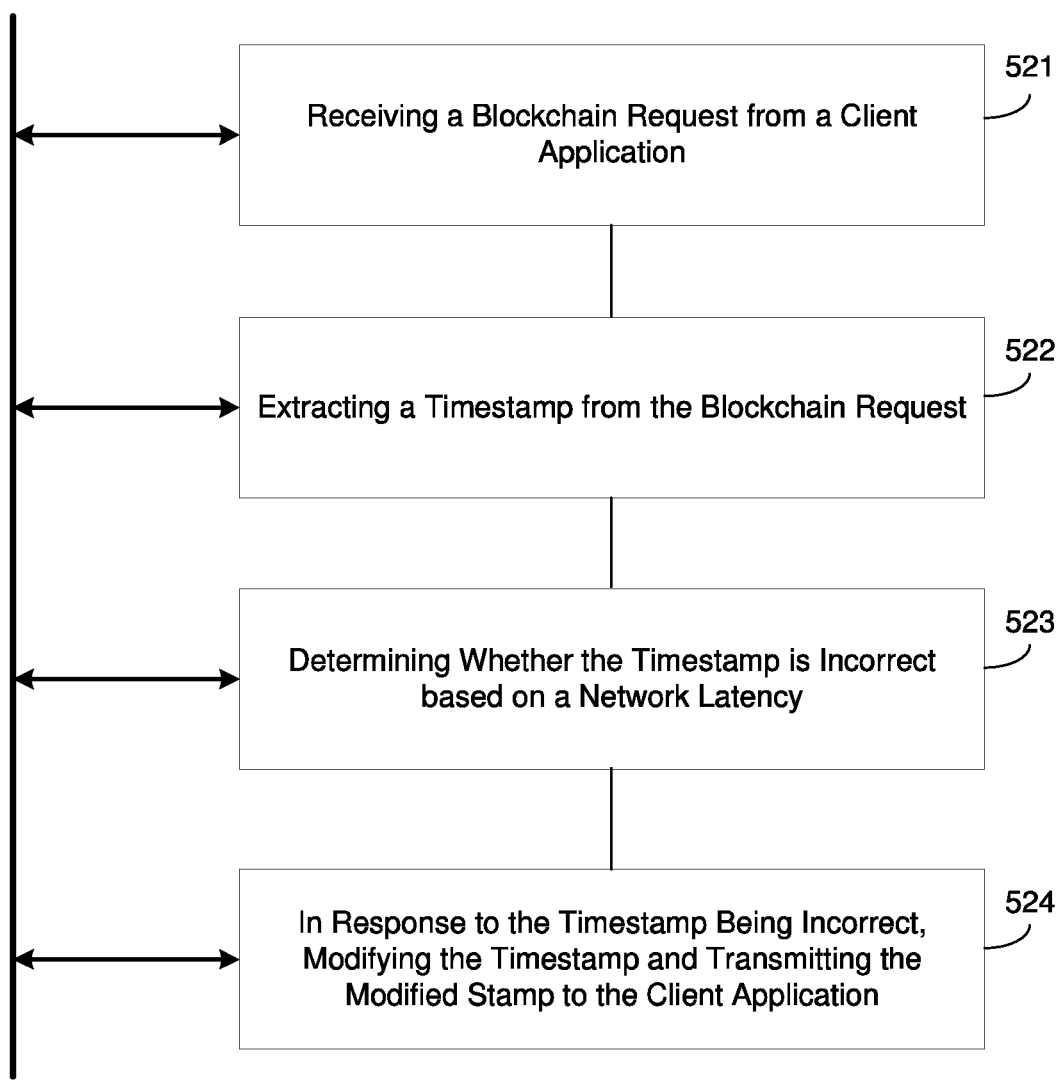
FIG. 5B is a diagram illustrating a method of modifying a timestamp of a blockchain transaction, according to example embodiments.

FIG. 5B illustrates a method 520 of modifying a timestamp of a blockchain transaction, according to example embodiments. For example, the method 520 may be performed by an endorsing peer node within a blockchain network. Referring to FIG. 5B, in 521, the method may include receiving a blockchain request from a client application hosted on a client system. For example, the blockchain request may include a transaction submitted by another peer node referred to as a client node. In 522, the method may include extracting a timestamp from the blockchain request. Here, the timestamp may be added to the transaction by the client application that submitted the transaction to the endorsing peer node.

In 523, the method may include determining whether or not the extracted timestamp is incorrect based on a network latency determined between the client application and the endorsing node by the client application. Furthermore, in response to a determination that the extracted timestamp is incorrect, in 524 the method may include determining a correct timestamp for the blockchain request, modifying the blockchain request by replacing the extracted timestamp with the correct timestamp, and transmitting the blockchain request with the corrected timestamp to the client application. In some embodiments, the method may further include determining the network latency between the client application and the endorsing node based on a network path between the peer node and the endorsing node. In some embodiments, the determining whether the extracted timestamp is incorrect may include estimating a timestamp for the blockchain request based on the network latency and determining whether the extracted timestamp is within a predefined threshold of the estimated timestamp. In some embodiments, the modifying may include replacing the extracted timestamp with the estimated timestamp. In some embodiments, the method may include determining whether the extracted timestamp is incorrect comprises determining whether the extracted timestamp is too early.

Figure 5C:
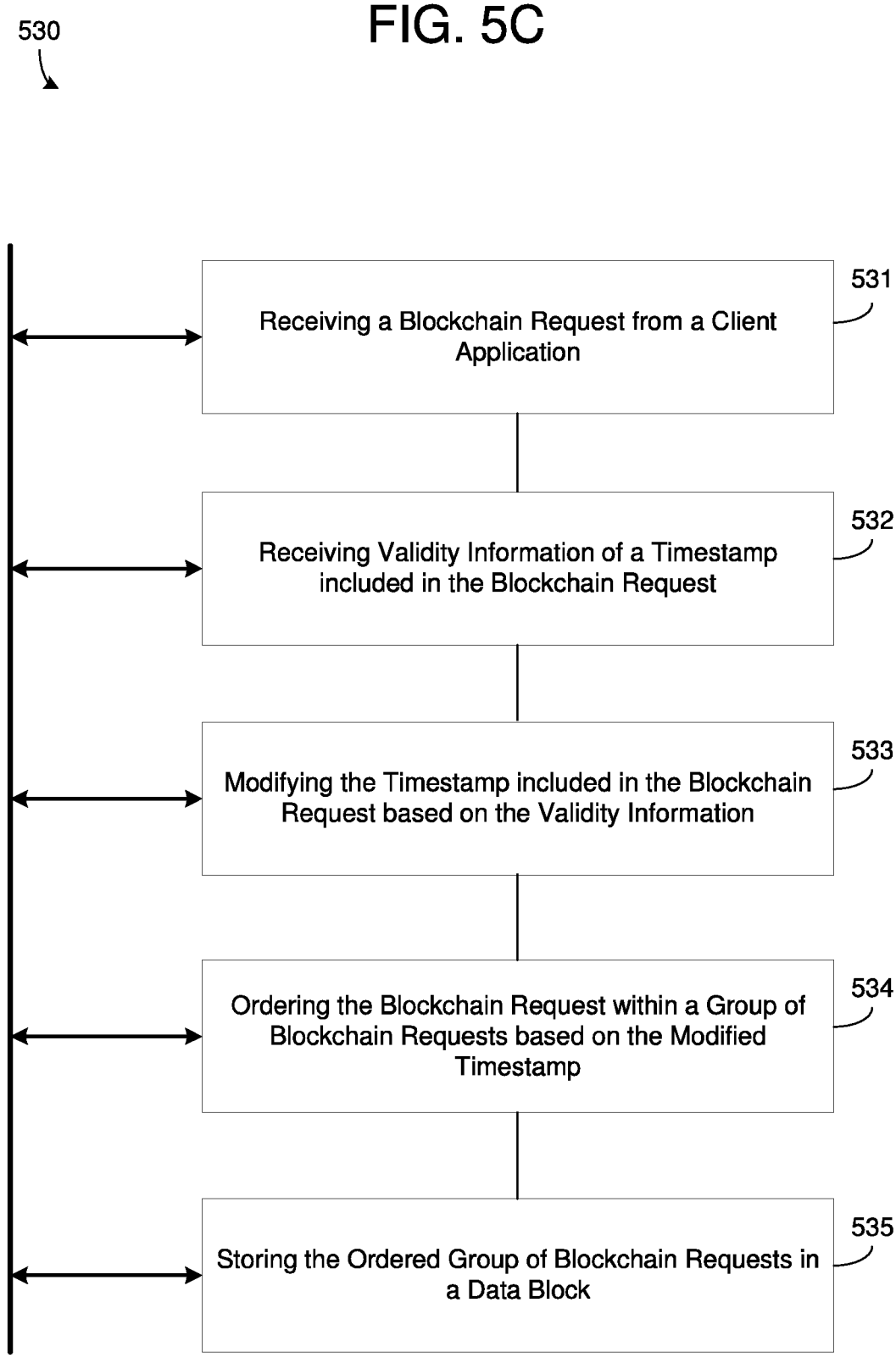
FIG. 5C is a diagram illustrating a method of modifying an original timestamp of a transaction based on validity information, according to example embodiments.

FIG. 5C illustrates a method 530 of modifying an original timestamp of a transaction based on validity information, according to example embodiments. For example, the method 530 may be performed by an ordering node of a blockchain network. Referring to FIG. 5C, in 531, the method may include receiving a blockchain request from a client application in a blockchain network. For example, the request may include a transaction submitted by a client node and endorsed by one or more other endorsing nodes. In 532, the method may include receiving validity information of a timestamp included in the blockchain request from one or more endorsing nodes in the blockchain network. For example, the validity information may include different proposed timestamps for the blockchain request which are proposed by one or more endorsing peer nodes. In some embodiments, the validity information may also include reputation information about the endorsing peer nodes for use giving weights to the proposed timestamps.

In 533, the method may include modifying the timestamp included in the blockchain request based on the validity information received from the one or more endorsing nodes. The modification may include generating a final timestamp value for the transaction that is different than the original timestamp added to the transaction by the client application that submitted the transaction to the blockchain network. For example, the modifying may include adding additional time to the timestamp included in the blockchain request in response to the validity information indicating the timestamp is too early in time.

In 534, the method may include ordering the blockchain request among a group of blockchain requests based on the modified timestamp with respect to timestamps of other blockchain requests in the group. For example, the blockchain transaction may be ordered or otherwise inserted in a queue with other transactions based on timestamp values. Here, the modified timestamp may change the positioning at which the blockchain transaction is inserted, arranged, or ordered in the queue in comparison to the original timestamp. The queue may be used to store a group of blockchain transactions which are to be stored in a data block of the blockchain. In 535, the method may include storing the ordered group of blockchain requests within a data block among a hash-linked chain of data blocks. In some embodiments, the method may further include transmitting the data block to the peer node and the one or more other peer nodes for storage in a blockchain.

Figure 5D:
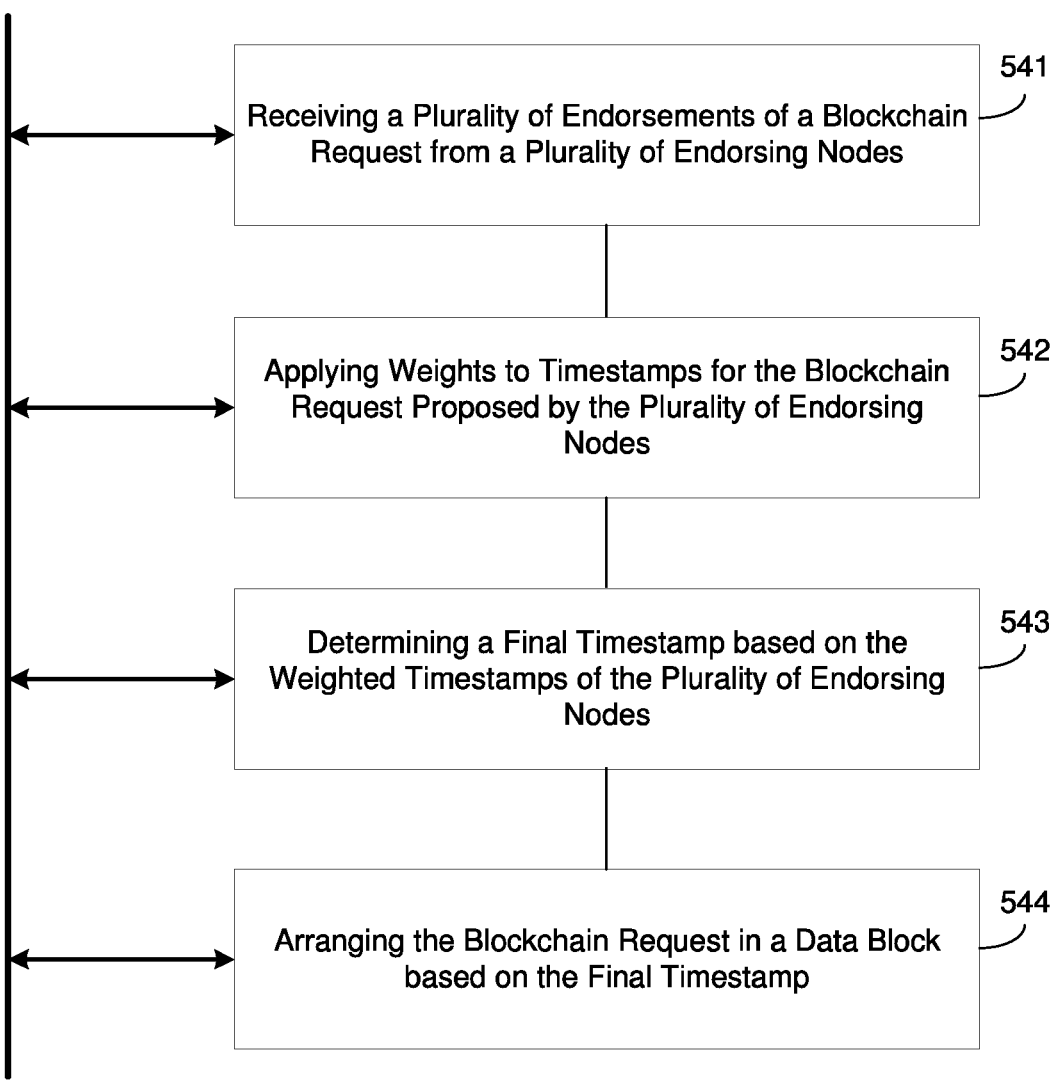
FIG. 5D is a diagram illustrating a method of determining a final timestamp for a transaction based on a weighted timestamps, according to example embodiments.

FIG. 5D illustrates a method 540 of determining a final timestamp for a transaction based on a weighted average of timestamps, according to example embodiments. For example, the method 540 may be performed by an ordering node of a blockchain network. Referring to FIG. 5D, in 541, the method may include receiving a plurality of endorsements of a blockchain request (e.g., a transaction, storage request, etc.) from a plurality of endorsing nodes of a blockchain network. According to various embodiments, the plurality of endorsements may include different timestamps proposed for the blockchain request by the plurality of endorsing nodes. For example, each endorsement may include a proposed timestamp by the endorsing peer node indicating a point in time at which the transaction was generated by a client application on a client peer node.

In 542, the method may include applying weights to the differing timestamps given by the plurality of endorsing nodes based on prior timestamp information of the plurality of endorsing nodes. The weights may be determined based on accuracies of the endorsing nodes within the blockchain network which are determined by other endorsing nodes. In some embodiments, each endorsing node among the plurality of peer nodes may include an accuracy value based on prior timestamp accuracy. In 543, the method may include determining a final timestamp for the blockchain request based on the weighted timestamps of the plurality of peer nodes, and, in 544, arranging the blockchain request in a data block based on the final determined timestamp. In some embodiments, the arranging may include inserting the blockchain request within an ordered queue of blockchain requests based on the final determined timestamp with respect to timestamps of the blockchain requests in the queue. In some embodiments, the method may further include storing the data block including the blockchain request within a hash-linked chain of data blocks.

Figure 5E:
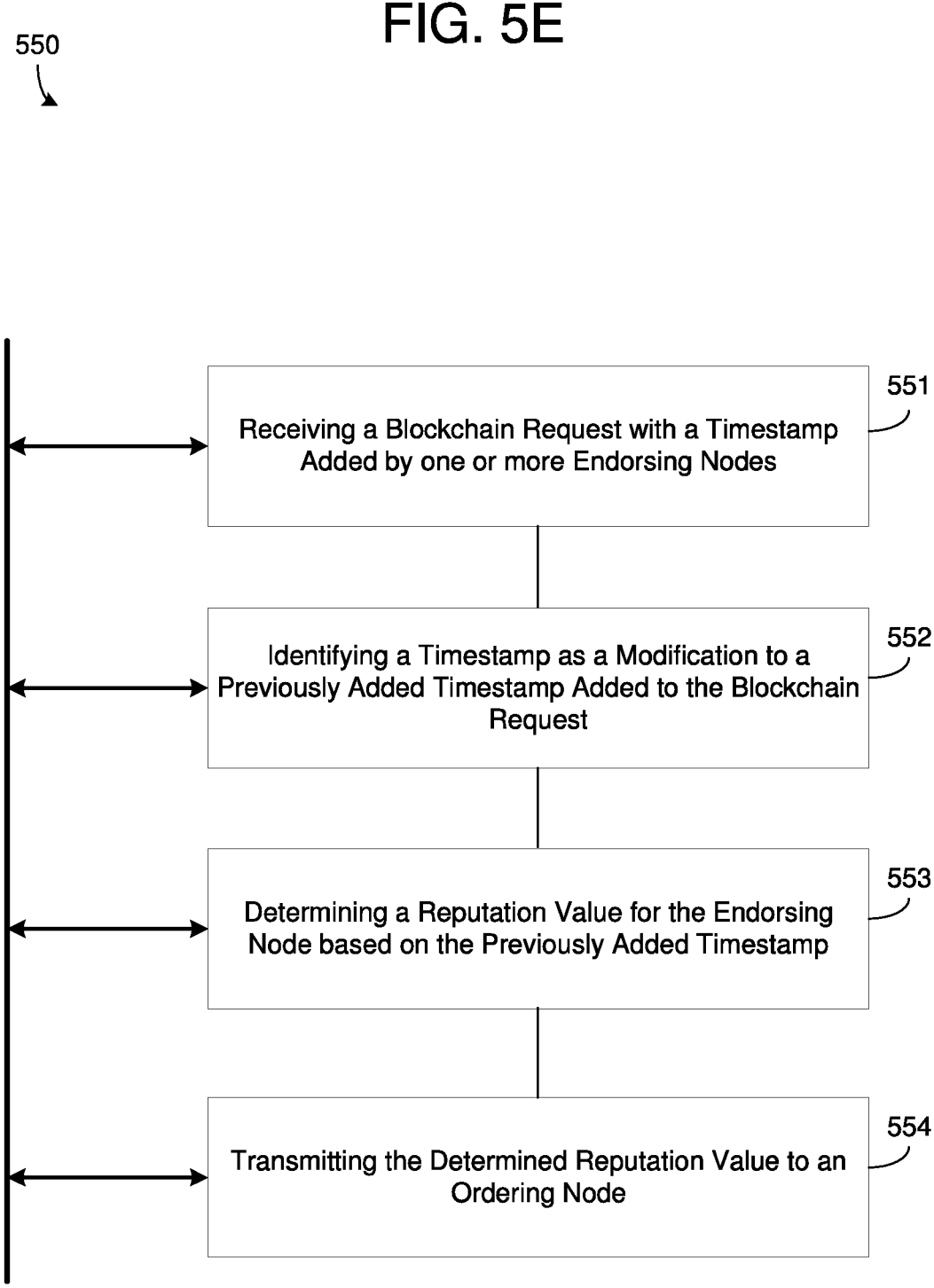
FIG. 5E is a diagram illustrating a method of determining a reputation value for a peer node, according to example embodiments.

FIG. 5E illustrates a method 550 of determining a reputation value for a peer node, according to example embodiments. For example, the method 550 may be performed by a client application (client node) that submits a transaction to a blockchain network, client device, and the like. Referring to FIG. 5E, in 551, the method may include receiving a blockchain request that includes a timestamp added by one or more endorsing nodes included within a blockchain network. Here, the timestamp may be a timestamp added to a blockchain request by at least one endorsing peer node. The timestamp may be a proposed time at which the client node generated the transaction. In 552, the method may include identifying that a timestamp added by an endorsing node among the one or more endorsing nodes is a modification to a previously added timestamp provided by the client application. That is, the client application may determine that the endorsing node has changed the timestamp originally added by the client application.

In 553, the method may include determining a reputation value for the endorsing node based on a difference between the timestamp added by the endorsing node and the previously added timestamp provided by the computing node. In some embodiments, the reputation value may be determined based on an accumulation of reputation values determined from previous blockchain requests which include a timestamp added by the endorsing node. In 554, the method may further include transmitting the determined reputation value of the endorsing node to an ordering node within the blockchain network. In some embodiments, the method may further include determining that the timestamp added by the endorsing node has too much delay based on a difference in time between the previously added timestamp and the timestamp added by the peer node.

In some embodiments, the determining in 553 may include assigning a lower reputation value to the endorsing node in response to the difference between the timestamp added by the endorsing node and the previously added timestamp being greater than an average difference from among a plurality of endorsing nodes on the blockchain network. As another example, the determining in 553 may include assigning a higher reputation value to the endorsing node in response to the difference between the timestamp added by the endorsing node and the previously added timestamp being less than the average difference from among the plurality of endorsing nodes on the blockchain network. In some embodiments, the method further include ignoring the timestamp added by the endorsing node and submitting the blockchain request to the ordering node with the previously added timestamp.

Figure 5F:
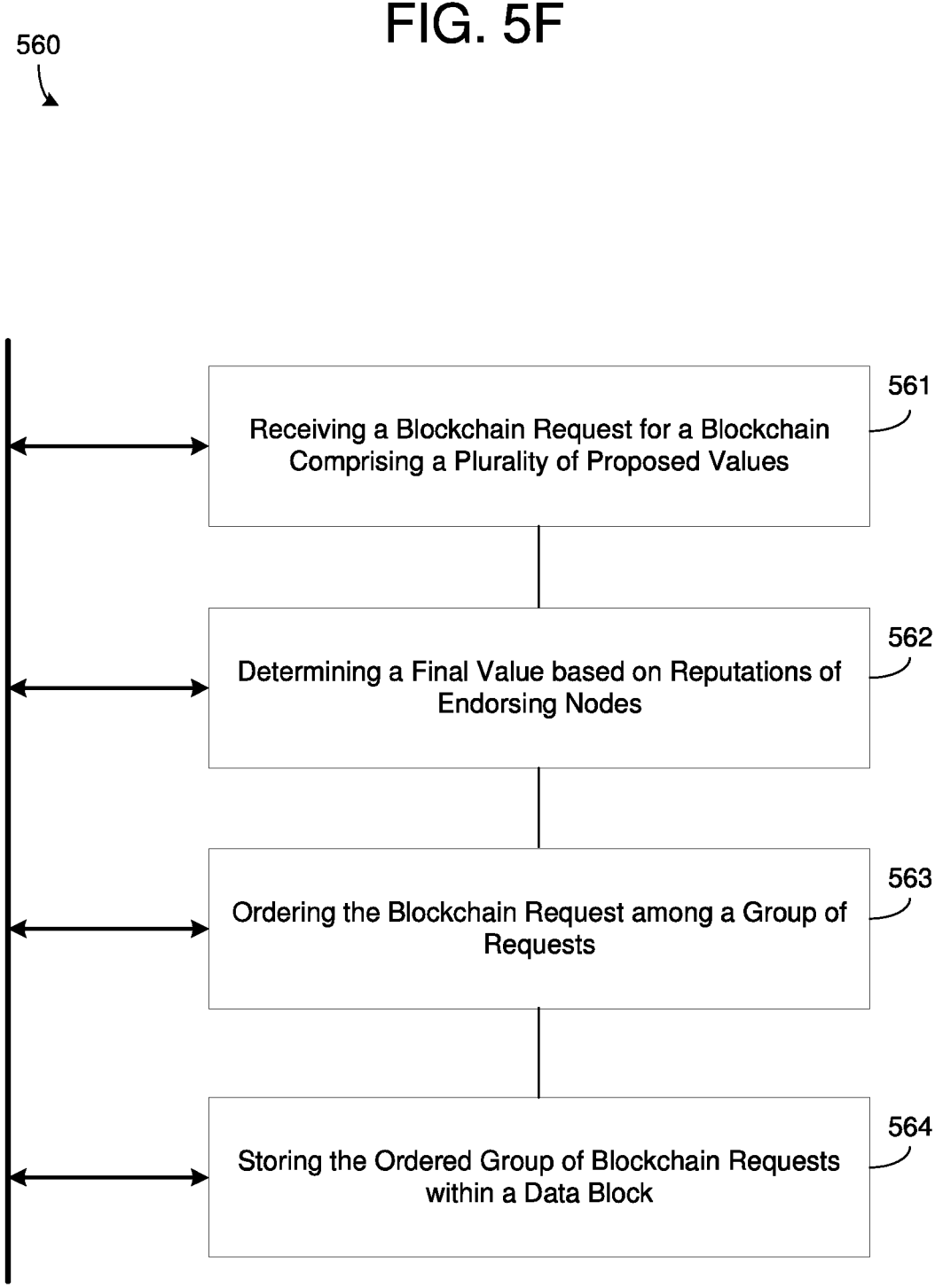
FIG. 5F is a diagram illustrating a method of determining a final value based on weighted reputation, according to example embodiments.

FIG. 5F illustrates a method 560 of determining a final value based on weighted reputation, according to example embodiments. For example, the method 560 may be performed by an ordering node of a blockchain network that receives a blockchain transaction and endorsements of the blockchain transaction and orders the transaction for storage in a data block on the blockchain. Referring to FIG. 5F, in 561 the method may include receiving a blockchain request for a blockchain. The storage request may include a transaction that includes a plurality of different values (e.g., timestamps, financial, opinions, medical diagnosis, etc.) proposed by a plurality of endorsing nodes of a blockchain network. Here, each endorsing peer node may propose a value to be applied to the transaction which is different than the original value added by the submitting (client) node. For example, different timestamps may represent an estimated time at which the storage request was submitted by a client to the blockchain network. However, the values are not limited to timestamps.

In 562, the method may include determining a final value for the blockchain request using a weighted combination of the different values based on respective reputations of the plurality of endorsing nodes. For example, the determining may include applying a higher weight to a value proposed by an endorsing node with a higher reputation and applying a lower weight to a different value proposed by a different endorsing node with a lower reputation. In 563, the method may include ordering the blockchain request within a group of blockchain requests based on the determined final value. In 564, the method may include storing the ordered group of storage requests within a data block among a hash-linked chain of data blocks.

Figure 6A:
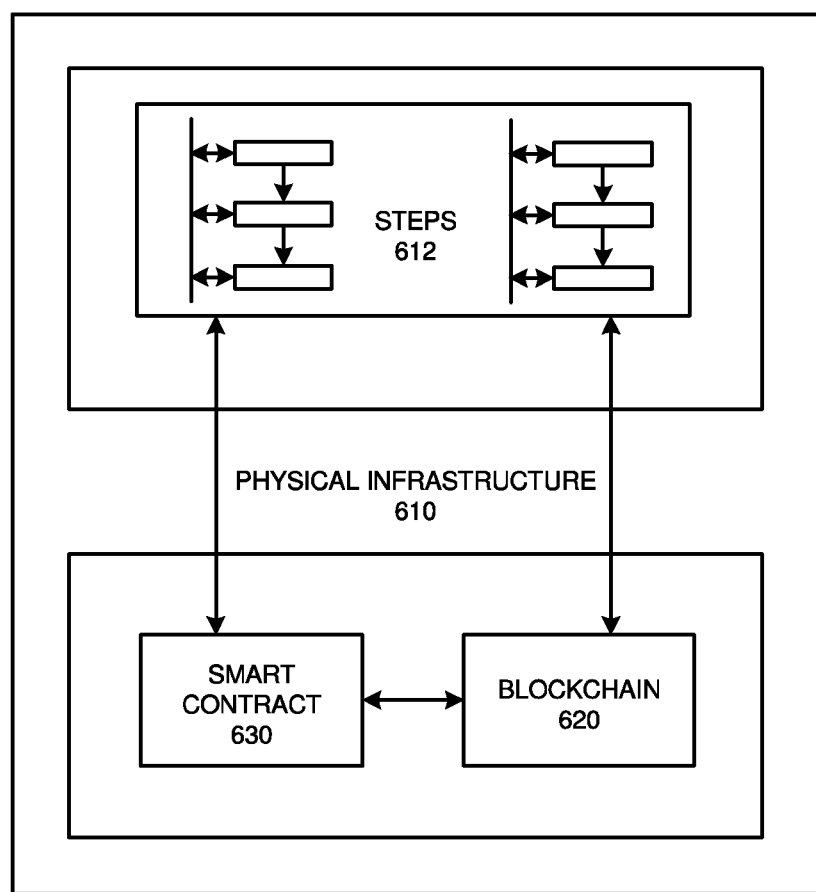
FIG. 6A is a diagram illustrating a physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices. In some embodiments, the smart contract 640 also referred to as chaincode may be executed to retrieve blockchain resource information from a blockchain notification board.

Figure 6B:
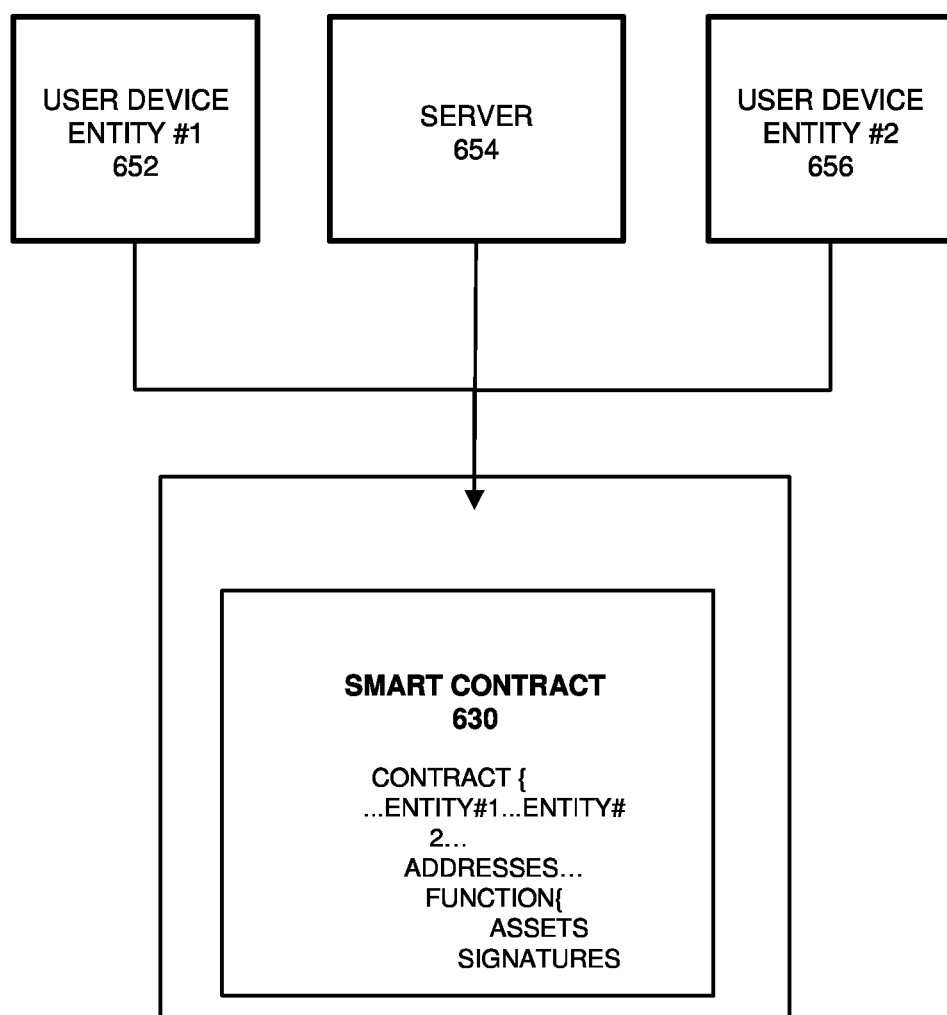
FIG. 6B is a diagram illustrating a smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650B may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

Figure 6C:
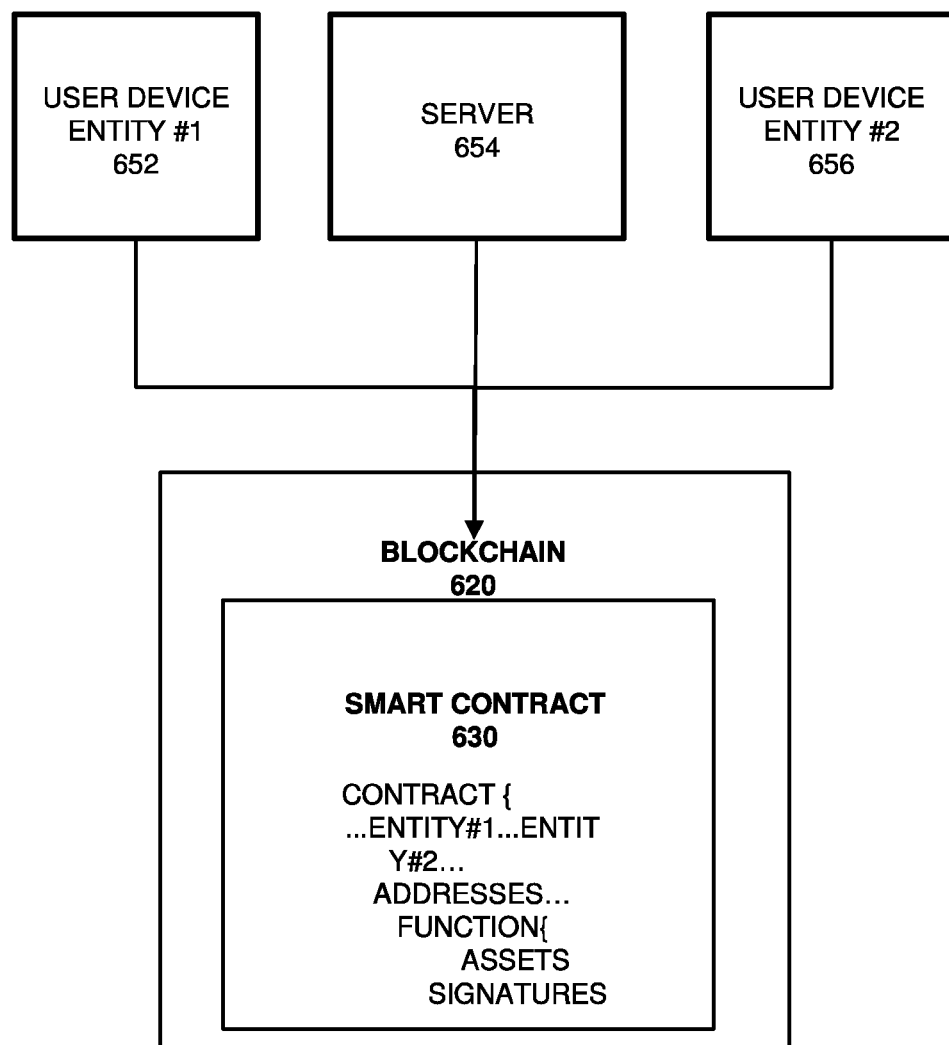
FIG. 6C is a diagram illustrating a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
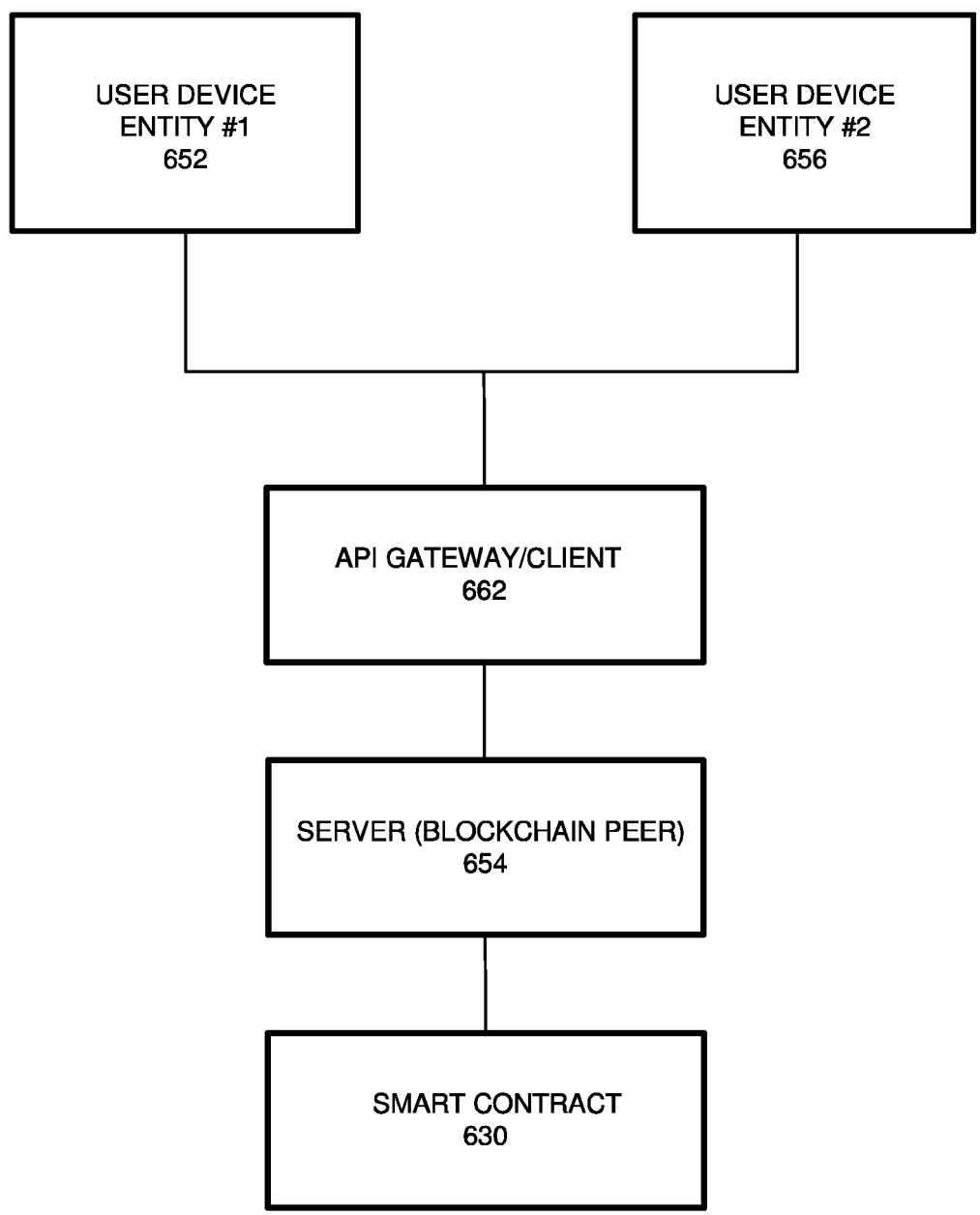
FIG. 6D is a diagram illustrating another example blockchain-based smart contact system, according to example embodiments.

FIG. 6D illustrates a common interface for accessing logic and data of a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.) In this example, the API gateway 662 is a common interface for performing transactions (invoke, queries, etc.) on the blockchain by connecting one or more entities 652 and 656 to a blockchain peer (i.e., server 654). The server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

Figure 7A:
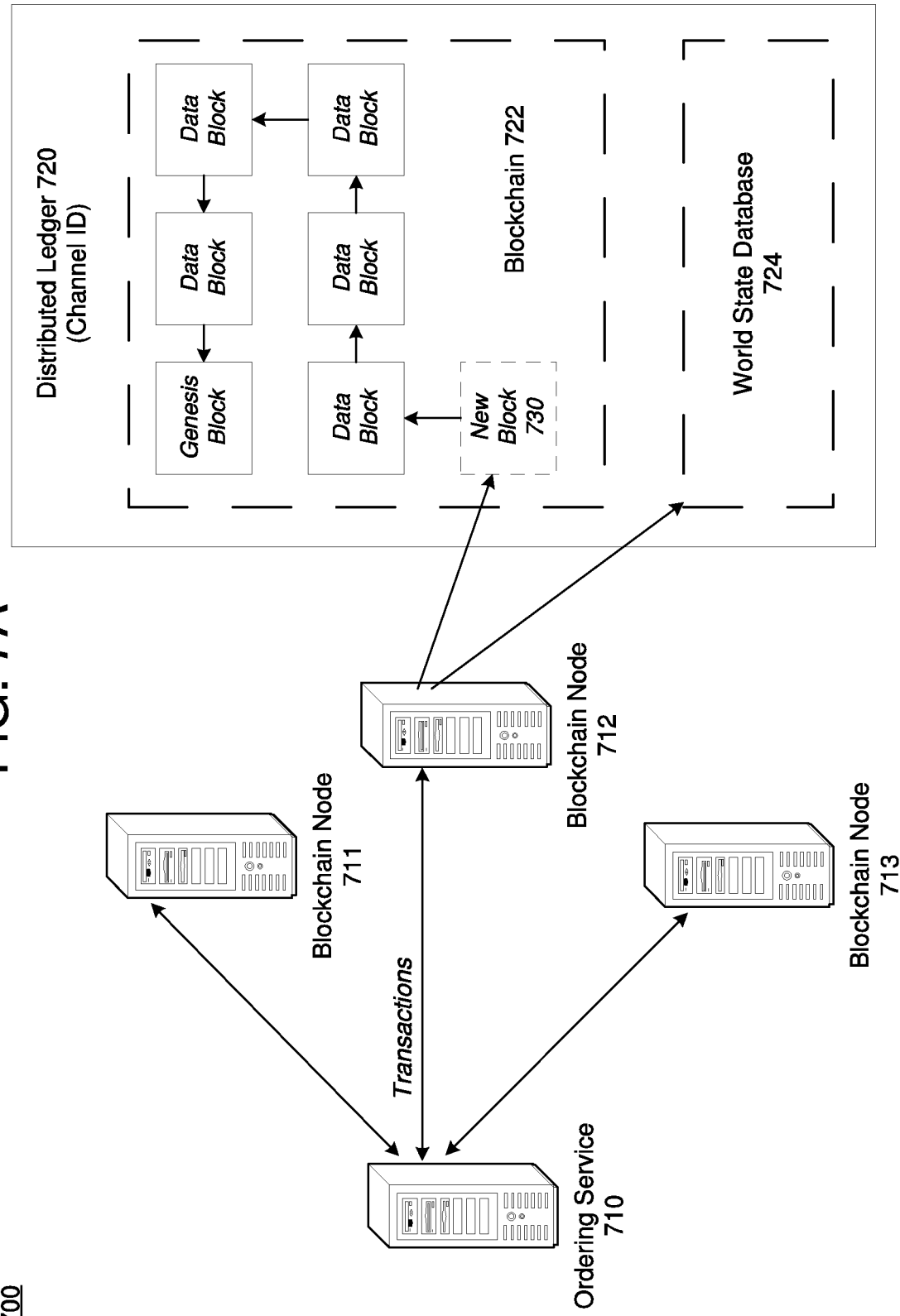
FIG. 7A is a diagram illustrating a process of a new block being added to a blockchain ledger, according to example embodiments.
Figure 7B:
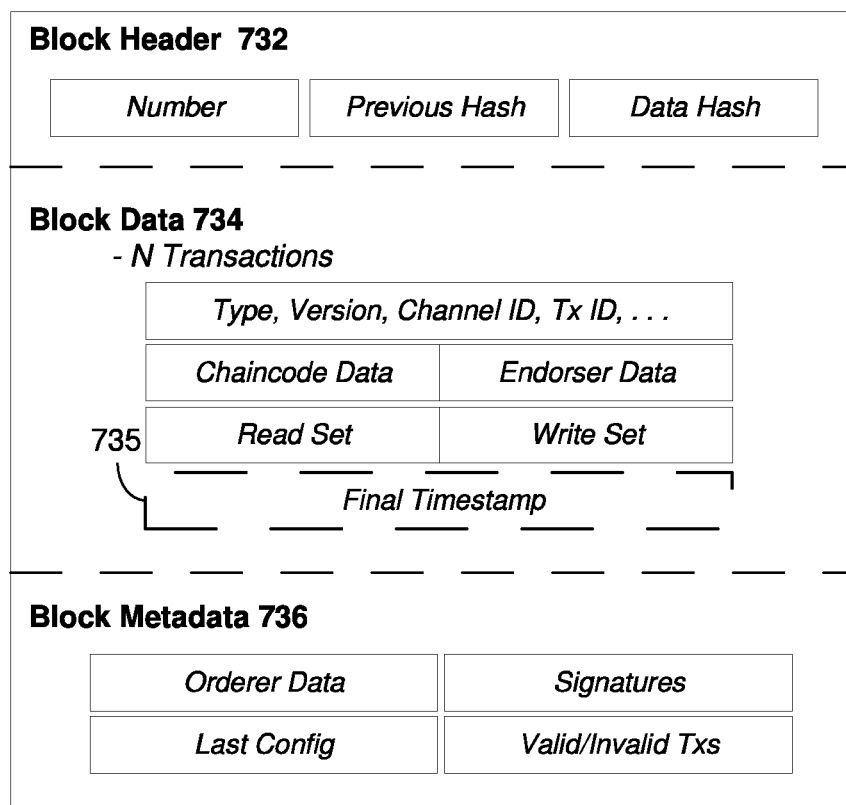
FIG. 7B is a diagram illustrating contents of a data block structure for blockchain, according to example embodiments.

FIG. 7A illustrates a process 700 of a new block 730 being added to a distributed ledger 720, according to example embodiments, and FIG. 7B illustrates contents of a block structure 730 for blockchain, according to example embodiments. Referring to FIG. 7A, clients (not shown) may submit transactions to blockchain nodes 711, 712, and/or 713. Clients may be instructions received from any source to enact activity on the blockchain. As an example, clients may be applications (based on a SDK) that act on behalf of a requester, such as a device, person or entity to propose transactions for the blockchain. The plurality of blockchain peers (e.g., blockchain nodes 711, 712, and 713) may maintain a state of the blockchain network and a copy of the distributed ledger 720.

Different types of blockchain nodes/peers may be present in the blockchain network including endorsing peers which simulate and endorse transactions proposed by clients and committing peers which verify endorsements, validate transactions, and commit transactions to the distributed ledger 720. In this example, the blockchain nodes 711, 712, and 713 may perform the role of endorser node, committer node, or both.

The distributed ledger 720 includes a blockchain 722 which stores immutable, sequenced records in blocks, and a state database 724 (current world state) maintaining a current state (key values) of the blockchain 722. One distributed ledger 720 may exist per channel and each peer maintains its own copy of the distributed ledger 720 for each channel of which they are a member. The blockchain 722 is a transaction log, structured as hash-linked blocks where each block contains a sequence of N transactions. Blocks (e.g., block 730) may include various components such as shown in FIG. 7B. The linking of the blocks (shown by arrows in FIG. 7A) may be generated by adding a hash of a prior block's header within a block header of a current block. In this way, all transactions on the blockchain 722 are sequenced and cryptographically linked together preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 720 may be stored in the state database 724. Here, the current state data represents the latest values for all keys ever included in the chain transaction log of the blockchain 722. Chaincode invocations execute transactions against the current state in the state database 724. To make these chaincode interactions extremely efficient, the latest values of all keys may be stored in the state database 724. The state database 724 may include an indexed view into the transaction log of the blockchain 722 and can therefore be regenerated from the chain at any time. The state database 724 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. The nodes needed to endorse a transaction depends on an endorsement policy which may be specified within chaincode. An example of an endorsement policy is "the majority of endorsing peers must endorse the transaction." Different channels may have different endorsement policies. Endorsed transactions are forward by the client application to an ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. The ordering service 710 may operate based on the timestamp agreement processes described herein such as calculating a final timestamp for each transaction based on a weighted average of timestamps from blockchain nodes 711-713, etc. In the example of FIG. 7A, blockchain node 712 is a committing peer that has received a new data block 730 for storage on blockchain 722.

The ordering service 710 may be made up of a cluster of orderers. The ordering service 710 does not process transactions, smart contracts, or maintain the shared ledger. Rather, the ordering service 710 may accept the endorsed transactions, determine a final timestamp for transactions, and specifies the order in which those transactions are committed to the distributed ledger 720 based on the final timestamps. The architecture of the blockchain network may be designed such that the specific implementation of 'ordering' (e.g., Solo, Kafka, BFT, etc.) becomes a pluggable component.

Transactions are written to the distributed ledger 720 in a consistent order. The order of transactions is established to ensure that the updates to the state database 724 are valid when they are committed to the network. Unlike a cryptocurrency blockchain system (e.g., Bitcoin, etc.) where ordering occurs through the solving of a cryptographic puzzle, or mining, in this example the parties of the distributed ledger 720 may choose the ordering mechanism that best suits that network such as chronological ordering.

When the ordering service 710 initializes a new block 730, the new block 730 may be broadcast to committing peers (e.g., blockchain nodes 711, 712, and 713). In response, each committing peer validates the transaction within the new block 730 by checking to make sure that the read set and the write set still match the current world state in the state database 724. Specifically, the committing peer can determine whether the read data that existed when the endorsers simulated the transaction is identical to the current world state in the state database 724. When the committing peer validates the transaction, the transaction is written to the blockchain 722 on the distributed ledger 720, and the state database 724 is updated with the write data from the read-write set. If a transaction fails, that is, if the committing peer finds that the read-write set does not match the current world state in the state database 724, the transaction ordered into a block will still be included in that block, but it will be marked as invalid, and the state database 724 will not be updated.

Referring to FIG. 7B, a block 730 (also referred to as a data block) that is stored on the blockchain 722 of the distributed ledger 720 may include multiple data segments such as a block header 732, block data 734, and block metadata 736. It should be appreciated that the various depicted blocks and their contents, such as block 730 and its contents shown in FIG. 7B are merely for purposes of example and are not meant to limit the scope of the example embodiments. In some cases, both the block header 732 and the block metadata 736 may be smaller than the block data 734 which stores transaction data, however this is not a requirement. The block 730 may store transactional information of N transactions (e.g., 100, 500, 1000, 2000, 3000, etc.) within the block data 734. According to various embodiments, each transaction may include a final timestamp information 735 within the block data 734 that is added by the ordering node 710. The final timestamp information 735 may be different (or a modification of) the original timestamp value that is provided by the submitting node.

The block 730 may also include a link to a previous block (e.g., on the blockchain 722 in FIG. 7A) within the block header 732. In particular, the block header 732 may include a hash of a previous block's header. The block header 732 may also include a unique block number, a hash of the block data 734 of the current block 730, and the like. The block number of the block 730 may be unique and assigned in an incremental/sequential order starting from zero. The first block in the blockchain may be referred to as a genesis block which includes information about the blockchain, its members, the data stored therein, etc.

The block data 734 may store transactional information of each transaction that is recorded within the block 730. For example, the transaction data stored within block data 734 may include one or more of a type of the transaction, a version, a timestamp (e.g., final calculated timestamp, etc.), a channel ID of the distributed ledger 720, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

According to various embodiments, the block data 734 section of block 730 may store information about modifications, updates, deletes, additions, or other changes to a timestamp of a blockchain transaction within final timestamp information 735. Accordingly, modifications to the timestamp information of a transaction may be stored within a blockchain (i.e., a hash-linked chain of blocks).

The block metadata 736 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committing node of the block (such as blockchain node 712) may add validity/invalidity information based on an endorsement policy, verification of read/write sets, and the like. The transaction filter may include a byte array of a size equal to the number of transactions in the block data 734 and a validation code identifying whether a transaction was valid/invalid.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 8 illustrates an example computer system architecture 800, which may represent or be integrated in any of the above-described components, etc.

Figure 8:
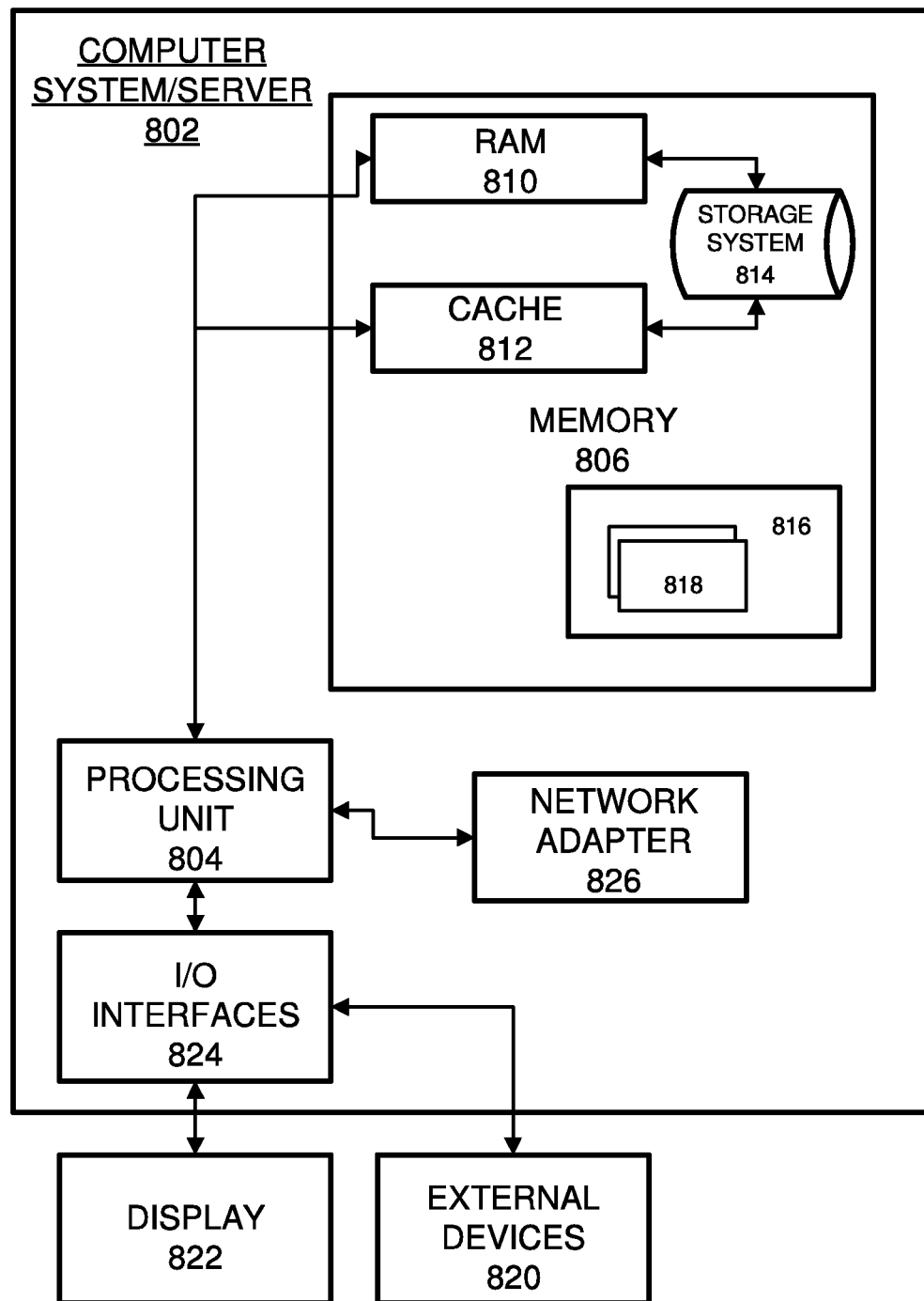
FIG. 8 is a diagram illustrating an example computer system configured to support one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove. For example, the computing node 800 may perform any of the methods 510-560 shown and described with respect to FIGS. 5A-5F.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An endorsing node, comprising:
a network interface configured to receive a blockchain request from a client application; and
a processor configured to determine a network latency between the client application and the endorsing node based on a network path between the client application and the endorsing node, extract a timestamp from the blockchain request, determine whether the extracted timestamp is invalid based on the network latency between the client application and the endorsing node, and in response to a determination that the timestamp is valid, generate an endorsement for the blockchain request and control the network interface to transmit the endorsement to the client application.

2. The endorsing node of claim 1, wherein the processor is further configured to decline to endorse the blockchain request in response to a determination that the timestamp is invalid.

3. The endorsing node of claim 1, wherein the network latency is determined by a monitoring thread that runs on the endorsing node and periodically measures the network latency between the endorsing node and each of multiple client applications within a blockchain network.

4. The endorsing node of claim 1, wherein the network latency is retrieved from an in-memory storage of the endorsing node.

5. The endorsing node of claim 1, wherein the processor is configured to estimate a timestamp for the blockchain request based on the network latency and determine whether the extracted timestamp is within a predefined threshold of the estimated timestamp to determine whether the extracted time stamp is valid.

6. The endorsing node of claim 1, wherein the processor is configured to determine whether the extracted timestamp is too early.

7. The endorsing node of claim 1, wherein the processor is further configured to simulate the blockchain request and generate the endorsement in response to a determination that the timestamp is valid and the blockchain request is simulated successfully.

8. A method of an endorsing node, comprising:
receiving a blockchain request from a client application;
determining a network latency between the client application and the endorsing node based on a network path between the client application and the endorsing node;
extracting a timestamp from the blockchain request;
determining whether the extracted timestamp is invalid based on the network latency between the client application and the endorsing node; and
in response to determining that the timestamp is valid, generating an endorsement for the blockchain request and transmitting the endorsement to the client application.

9. The method of claim 8, further comprising, in response to determining that the timestamp is invalid, declining to endorse the blockchain request.

10. The method of claim 8, wherein the network latency is determined by a monitoring thread running on the endorsing node that periodically measures the network latency between the endorsing node and each of multiple client applications within a blockchain network.

11. The method of claim 8, wherein the network latency is retrieved from an in-memory storage of the endorsing node.

12. The method of claim 8, wherein the determining whether the extracted timestamp is invalid comprises estimating a timestamp for the blockchain request based on the network latency and determining whether the extracted timestamp is within a predefined threshold of the estimated timestamp.

13. The method of claim 8, wherein the determining whether the extracted timestamp is invalid comprises determining whether the extracted timestamp is too early.

14. The method of claim 8, further comprising simulating the blockchain request and generating the endorsement in response to the timestamp being determined as valid and the blockchain request being simulated successfully.

15. A non-transitory computer readable medium comprising instructions, that when read by a processor, cause the processor to perform a method comprising:
receiving a blockchain request from a client application;
determining a network latency between the client application and an endorsing node based on a network path between the client application and the endorsing node;
extracting a timestamp from the blockchain request;
determining whether the extracted timestamp is invalid based on the network latency between the client application and the endorsing node; and
in response to determining that the timestamp is valid, generating an endorsement for the blockchain request and transmitting the endorsement to the client application.

16. An endorsing node, comprising:
a network interface configured to receive a blockchain request from a client application; and
a processor configured to extract a timestamp from the blockchain request, determine whether or not the extracted timestamp is incorrect based on a network latency determined between the client application and the endorsing node by the endorsing node, and in response to a determination that the extracted timestamp is incorrect, determine a correct timestamp for the blockchain request, modify the blockchain request via replacement of the extracted timestamp with the correct timestamp, and control the network interface to transmit the blockchain request with the corrected timestamp to the client application.

17. The endorsing node of claim 16, wherein the processor is further configured to determine the network latency between the client application and the endorsing node based on a network path between the peer node and the endorsing node.

18. The endorsing node of claim 16, wherein the processor is configured to estimate a timestamp for the blockchain request based on the network latency and determine whether the extracted timestamp is within a predefined threshold of the estimated timestamp to determine whether the extract timestamp is incorrect.

19. The endorsing node of claim 18, wherein the processor is configured to replace the extracted timestamp with the estimated timestamp.

20. The endorsing node of claim 16, wherein the processor is configured to determine whether the extracted timestamp is too early.

21. A method of an endorsing node, comprising:
receiving a blockchain request from a client application;
extracting a timestamp from the blockchain request;
determining whether or not the extracted timestamp is incorrect based on a network latency determined between the client application and the endorsing node determined by the endorsing node; and
in response to a determination that the extracted timestamp is incorrect, determining a correct timestamp for the blockchain request, modifying the blockchain request by replacing the extracted timestamp with the correct timestamp, and transmitting the blockchain request with the corrected timestamp to the client application.

22. The method of claim 21, further comprising determining the network latency between the client application and the endorsing node based on a network path between the client application and the endorsing node.

23. The method of claim 21, wherein the determining whether the extracted timestamp is incorrect comprises estimating a timestamp for the blockchain request based on the network latency and determining whether the extracted timestamp is within a predefined threshold of the estimated timestamp.

24. The method of claim 23, wherein the modifying comprises replacing the extracted timestamp with the estimated timestamp.

25. The method of claim 21, wherein the determining whether the extracted timestamp is incorrect comprises determining whether the extracted timestamp is too early.

* * * * *